United States Patent [19]
Kayashima et al.

[11] Patent Number: 5,831,711
[45] Date of Patent: Nov. 3, 1998

[54] OPTICAL DEFLECTOR DEVICE

[75] Inventors: Shigeo Kayashima; Shin Eguchi; Takahiro Matsuda; Manabu Ishimoto; Yoshihiro Mizuno, all of Kawasaki, Japan

[73] Assignee: Fujitsu Limited, Kawasaki, Japan

[21] Appl. No.: 551,848

[22] Filed: Nov. 7, 1995

[30] Foreign Application Priority Data

Mar. 20, 1995 [JP] Japan .................................... 7-061326

[51] Int. Cl.$^6$ ........................................................ G02F 1/13
[52] U.S. Cl. .......................................... 349/201; 349/202
[58] Field of Search .............................. 349/33, 201, 202

[56] References Cited

U.S. PATENT DOCUMENTS

| | | |
|---|---|---|
| 3,758,195 | 9/1973 | Hedman, Jr. et al. ................... 349/33 |
| 3,813,145 | 5/1974 | Hedman, Jr. et al. . |
| 4,729,641 | 3/1988 | Matsuoka et al. ....................... 349/201 |
| 4,937,539 | 6/1990 | Grinberg et al. ........................ 349/202 |

FOREIGN PATENT DOCUMENTS

| | | |
|---|---|---|
| 89 05 407 | 6/1989 | Germany . |
| 2-289815 | 11/1990 | Japan . |
| 2 187 567 | 9/1987 | United Kingdom . |

*Primary Examiner*—William L. Sikes
*Assistant Examiner*—James Dudek
*Attorney, Agent, or Firm*—Armstrong, Westerman, Hattori, McLeland & Naughton

[57] ABSTRACT

An optical deflector device includes a VGM cell including a film of a nematic liquid crystal material which generates a distribution of spatial frequencies when subjected to an electric field. A film thickness setting unit sets a thickness distribution of the film in the VGM cell in accordance with a film thickness distribution defined by a predetermined function.

7 Claims, 21 Drawing Sheets

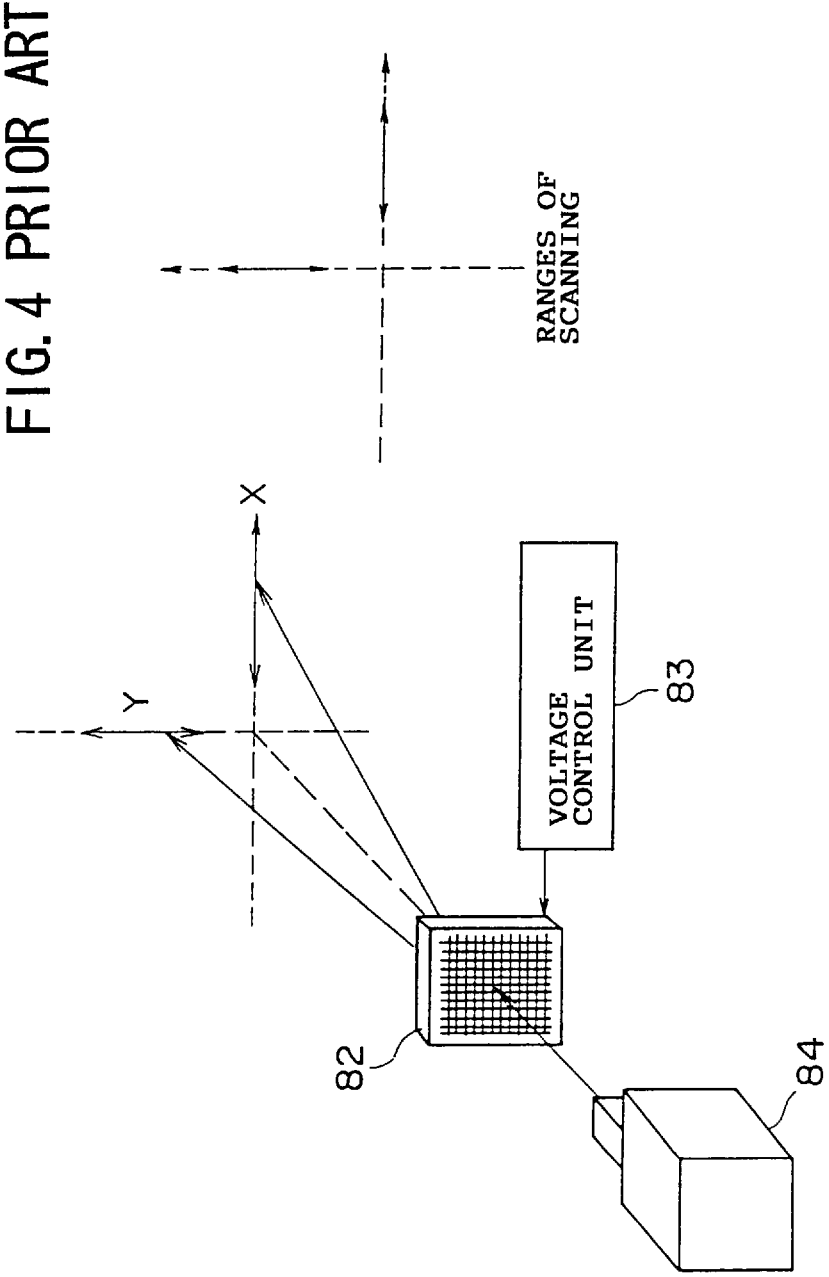

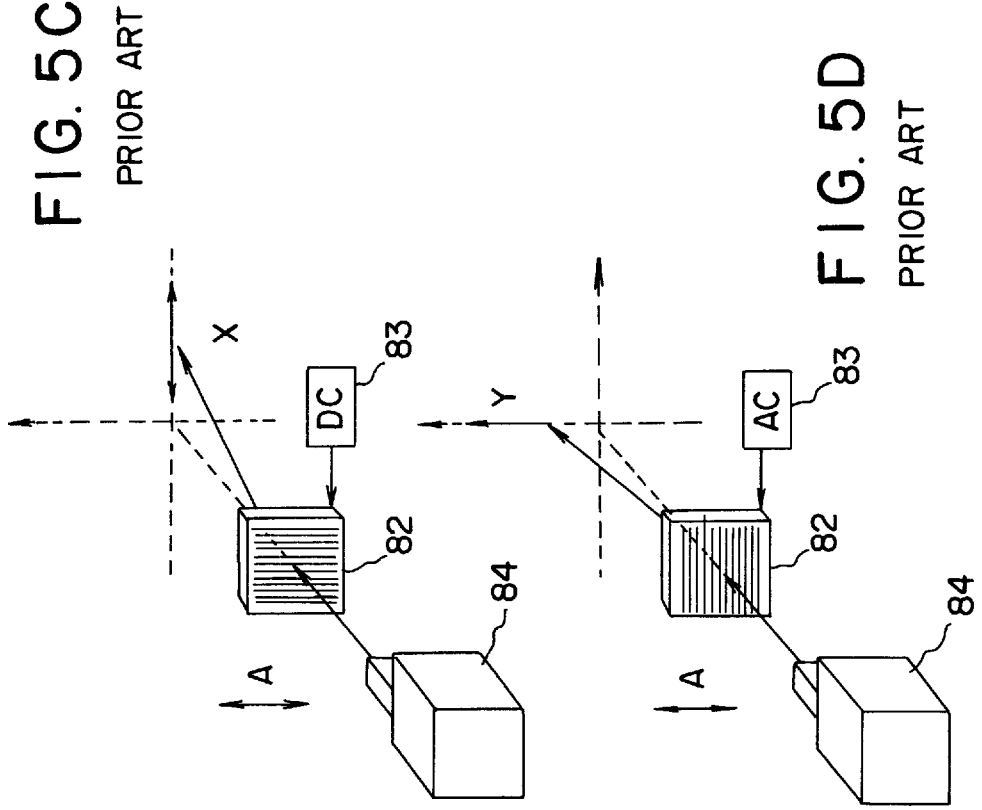
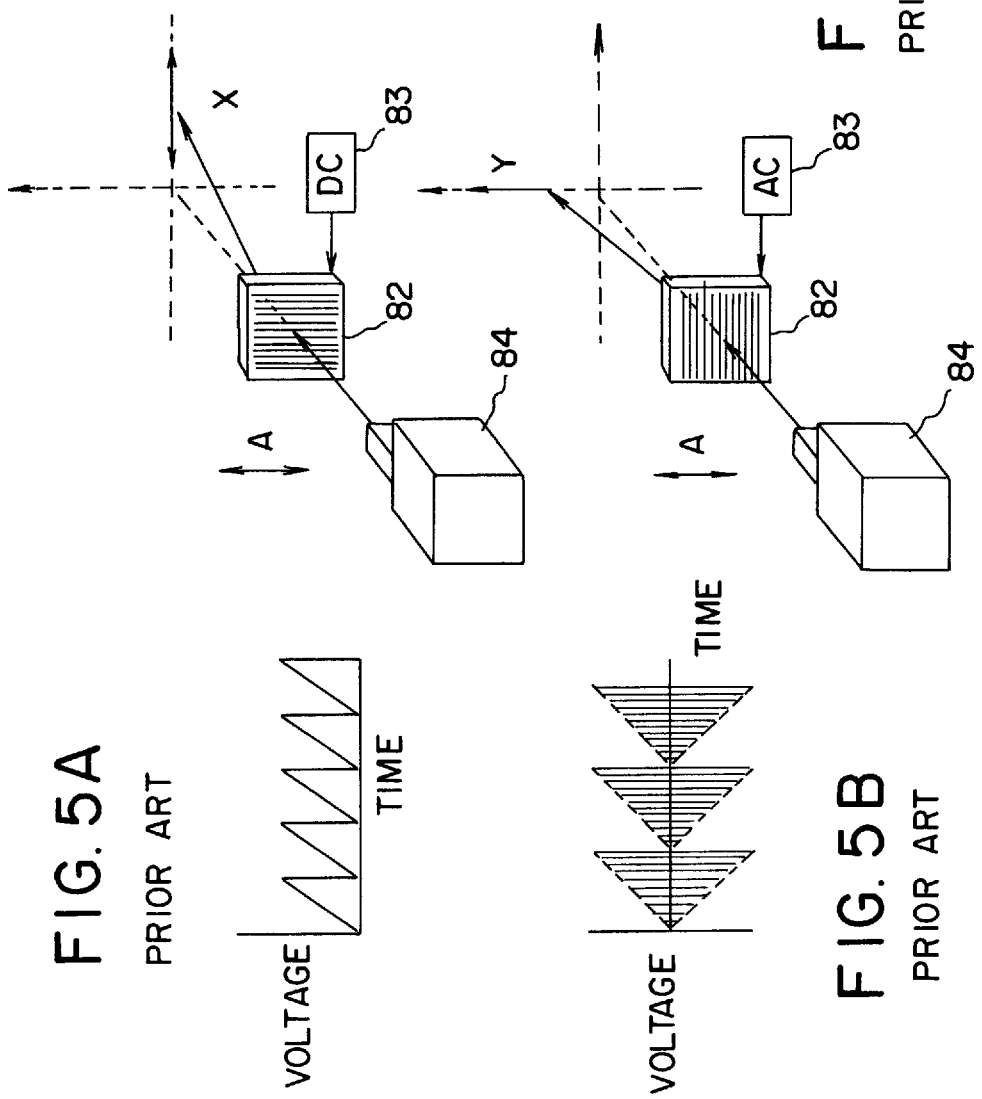

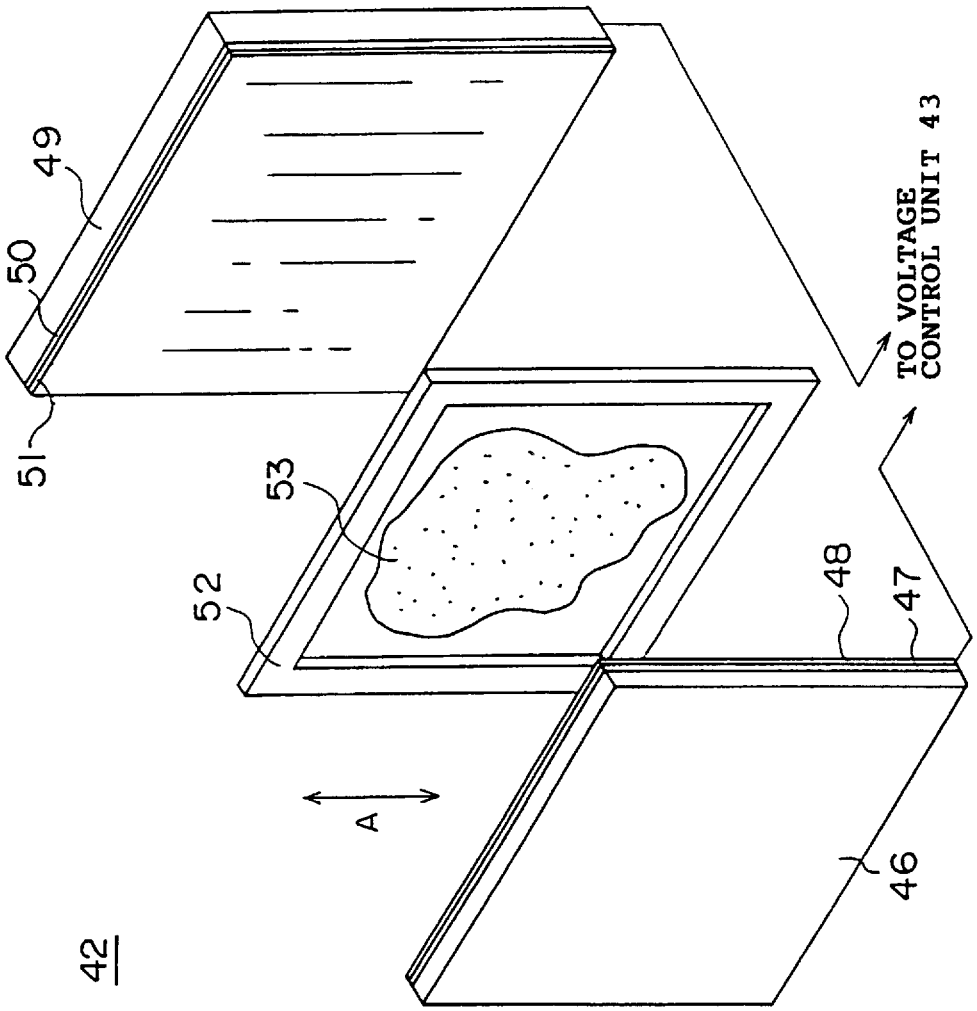

RANGE OF SCANNING

OPTICAL DEFLECTOR DEVICE

BACKGROUND OF THE INVENTION (1) Field of the Invention

The present invention generally relates to an optical deflector device, and, more particularly, to an optical deflector device which produces a distribution of spatial frequencies by electrically controlling a variable grating mode (VGM) cell of the optical deflector device.

A conventional mechanical-type optical deflector has been used for optical deflection. The mechanical-type deflector such as a galvanomirror, uses a moving unit such as a mirror, to deflect a transmitted or reflected beam. However, when the moving unit is moved in the deflector, the transmitted or reflected beam is oscillated together with the moving unit. It is difficult to mechanically control the focal length by using the mechanical-type optical deflector with high accuracy. Therefore, it is desirable to provide an optical deflector device which does not require any moving unit and which realizes a high level of accuracy of the optical deflection.

(2) Description of the Related Art

FIG. 1 shows a conventional optical deflector device 71 which includes a variable grating mode (VGM) cell 72. It is observed that a distribution of spatial frequencies is produced by electrically controlling the VGM cell 72.

Referring to FIG. 1, the optical deflector device 71 includes the VGM cell 72 and a power supply 73. The VGM cell 72 generates a voltage-controlled distribution of spatial frequencies in accordance with an electrical field applied to the VGM cell 72. The power supply 73 generates an electrical field to which the VGM cell 72 is subjected.

In the conventional optical deflector device 71, the VGM cell 72 includes two transparent glass plates 74 and 77, each having plane-opposed parallel faces. The glass plates 74 and 77 are positioned opposite each other so that the adjacent inner faces of the two plates are parallel.

A transparent electrode 75 is continuously formed on the inner face of the glass plate 74, and an orientation layer 76 is formed on the transparent electrode 75. A transparent electrode 78 is continuously formed on the inner face of the glass plate 77, and an orientation layer 79 is formed on the transparent electrode 78.

The transparent electrodes 75 and 78 are made of a transparent conductive material such as indium-tin-oxide (ITO).

The distance between the inner faces of the two glass plates 74 and 77 is held by a spacer 80 at a predetermined distance. The spacer 80 is inserted between the orientation layers 76 and 79. A liquid crystal 81 is injected into an internal space between the glass plates 74 and 77. The liquid crystal 81 is made of a "nematic" liquid crystal material, and the film thickness of the liquid crystal 81 is held to be constant along the inner faces of the glass plates 74 and 77.

When the VGM cell 72 is subjected to an electrical field above a threshold value, "diffraction" patterns of the transmitted rays are produced by the liquid crystal 81 of the VGM cell 72. The distribution of the spatial frequencies generated by the VGM cell 72 is varied depending on the film thickness of the liquid crystal 81 and depending on the electrical field applied to the VGM cell 72.

FIG. 2 shows an operation of the optical deflector device in FIG. 1, which provides characteristics of a cylindrical lens device. As shown in FIG. 2, the liquid crystal of the VGM cell 72 is divided into small liquid crystal elements, and the respective electrical field to which the liquid crystal elements are subjected is varied with respect to each other. Since the deflection directions of the transmitted rays from the liquid crystal elements are varied with respect to each other, the transmitted rays are deflected to the incident rays and they converge at a focal point. Thus, the operation of the optical deflector device provides the characteristics of a cylindrical lens device.

However, in the optical deflector device in FIG. 2, it is impossible to make a width of the convergent bundle of the transmitted rays from the above optical deflector device smaller than the size of each liquid crystal element. The size of each liquid crystal element is indicated by an arrow "d" in FIG. 2. The distributions of spatial frequencies produced by the small liquid crystal elements are the same.

Accordingly, it is difficult to adapt the optical deflector device shown in FIG. 2 to a scanning device which requires the scanning of an image by a very small beam.

FIG. 3 shows a conventional liquid crystal display device which utilizes a cell containing a liquid crystal material. The conventional liquid crystal display device of the above type is disclosed in, for example, U.S. Pat. No. 3,813,145.

In FIG. 3, the liquid crystal display device includes a VGM cell 82, a voltage control unit 83 which generates an electrical field applied to the VGM cell 82, and a light source 84 which supplies light rays which are incident to the VGM cell 82. The voltage control unit 83 is capable of generating a DC-excited or AC-excited field which is applied to the VGM cell 82. This allows the transmitted rays from the VGM cell 82 to perform the scanning over a display plane in X and Y directions. FIG. 4 shows the ranges of the scanning performed by the display device in FIG. 3.

FIGS. 5A and 5B show operations of the display device in FIG. 3 when the VGM cell is subjected to the DC-excited field and when the VGM cell is subjected to the AC-excited field. In FIGS. 5A and 5B, the initial orientation direction of the liquid crystal molecules is indicated by an arrow "A".

For example, when the voltage control unit 83 generates the DC-excited field above a predetermined threshold value, the "diffraction" patterns which are parallel to the initial orientation direction "A" are produced by the VGM cell 82. The incident rays from the light source 84 enter the VGM cell 82, and the transmitted rays from the VGM cell 82 scan the display plane because of a periodic change of the electric field applied to the VGM cell 42. The range of the scanning performed with the transmitted rays from the VGM cell 82 is on the X axis as shown in FIG. 5A.

When the voltage control unit 83 generates the AC-excited field above the predetermined threshold value, the "diffraction" patterns which are perpendicular to the initial orientation direction "A" are produced by the VGM cell 82. The range of the scanning performed with the transmitted rays from the VGM cell 82 is on the Y axis as shown in FIG. 5B.

However, in the above liquid crystal display device, the VGM cell 82 is subjected to one of the DC-excited and AC-excited fields which are greater than the threshold value, in order to perform the scanning over the display plane in each of the X and Y directions. It is observed that the range of the scanning in the X direction and the range of the scanning in the Y direction are displaced from each other. That is, the above liquid crystal display device has a problem in that the range of scanning with respect to the rays deflected by the VGM cell 82 when subjected to the DC-excited field and the range of scanning with respect to the rays deflected when subjected to the AC-excited field hardly overlap with each other. Thus, it is difficult to suitably carry out a two-dimensional scanning by electrically controlling the VGM cell of the above liquid crystal display device.

SUMMARY OF THE INVENTION

An object of the present invention is to provide an improved optical deflector device in which the above-described problems are eliminated.

Another object of the present invention is to provide an optical deflector device which carries out an optical deflection with a high level of accuracy by electrically controlling a VGM cell.

Still another object of the present invention is to provide an optical deflector device which is capable of carrying out a multi-directional scanning with a good reliability by electrically controlling a VGM cell.

The above-mentioned objects of the present invention are achieved by an optical deflector device which includes a VGM cell including a film of a nematic liquid crystal material which generates a distribution of spatial frequencies when subjected to an electric field, and a film thickness setting unit which sets a distribution of thickness of the film in the VGM cell in accordance with a film thickness distribution defined by a predetermined function.

The above-mentioned objects of the present invention are achieved by an optical deflector device which includes: a VGM cell including a film of a nematic liquid crystal material which generates a distribution of spatial frequencies when subjected to an electric field, wherein the VGM cell deflects incident rays in a deflection direction perpendicular to an initial orientation direction when subjected to an DC-excited field above a threshold value, and the VGM cell deflects the incident rays in a deflection direction parallel to the initial orientation direction when subjected to an AC-excited field above the threshold value; and a deflecting unit which deflects the deflected rays from the VGM cell to a predetermined position, so that a range of scanning with respect to the deflected rays from the deflecting unit and a range of scanning with respect to the deflected rays from the VGM cell, not deflected by the deflecting unit, substantially overlap each other.

According to the present invention, it is possible to carry out an optical deflection with a reasonably high accuracy by utilizing the VGM cell and the film thickness setting unit. In addition, it is possible to carry out a multi-directional scanning with good reliability by utilizing the VGM cell and the reflector unit.

BRIEF DESCRIPTION OF THE DRAWINGS

The above and other objects, features and advantages of the present invention will be more apparent from the following detailed description when read in conjunction with the accompanying drawings in which:

FIG. 3 is a diagram of a voltage-controlled two-dimensional liquid crystal display device which utilizes a VGM cell containing a liquid crystal material;

FIG. 4 is a diagram showing ranges of scanning performed by the display device in FIG. 3;

FIGS. 5A through 5D are diagrams for explaining operations of the display device in FIG. 3;

FIG. 17 is a perspective exploded view of the optical deflector device in FIG. 16;

DESCRIPTION OF THE PREFERRED EMBODIMENTS

A description will now be given of various preferred embodiments of the present invention with reference to the accompanying drawings.

Figure 1:
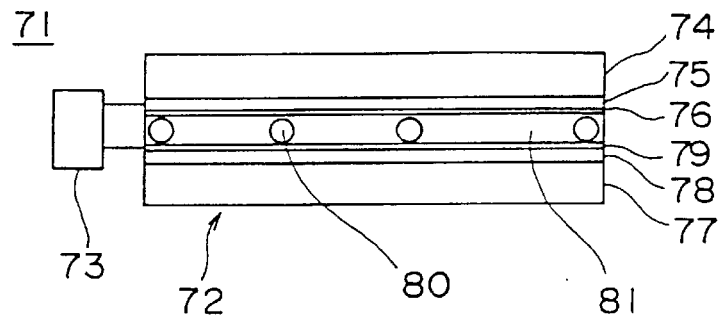
FIG. 1 is a cross-sectional view of a conventional optical deflector device which includes a VGM cell.
Figure 2:
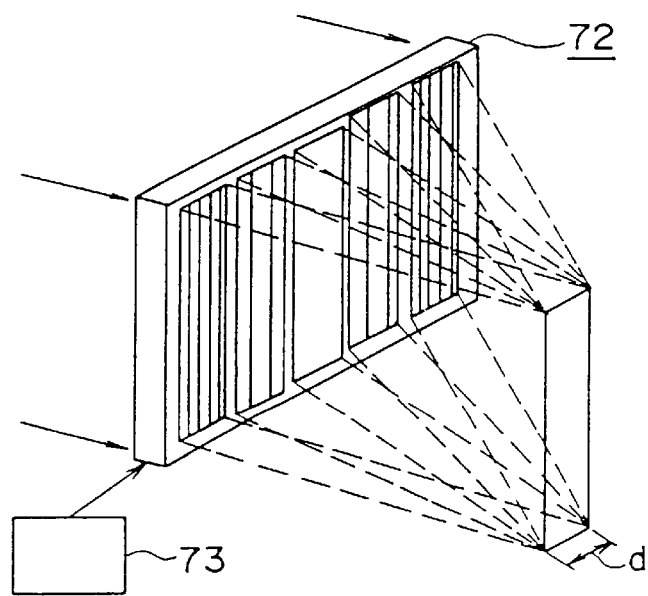
FIG. 2 is a diagram for explaining an operation of the optical deflector device in FIG. 1 which provides characteristics of a cylindrical lens device.
Figure 6:
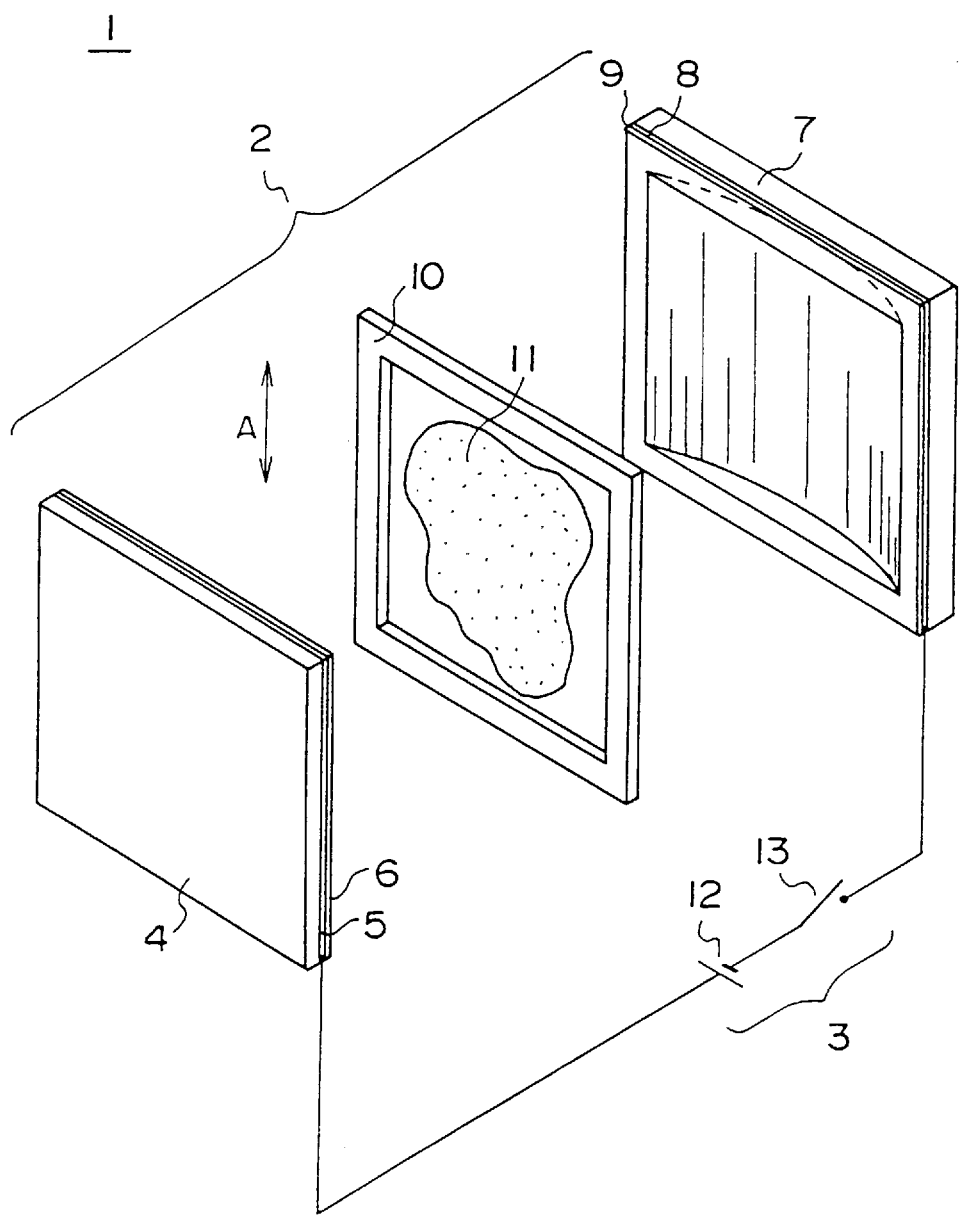
FIG. 6 is a perspective exploded view of an optical deflector device in a first embodiment of the present invention.
Figure 7:
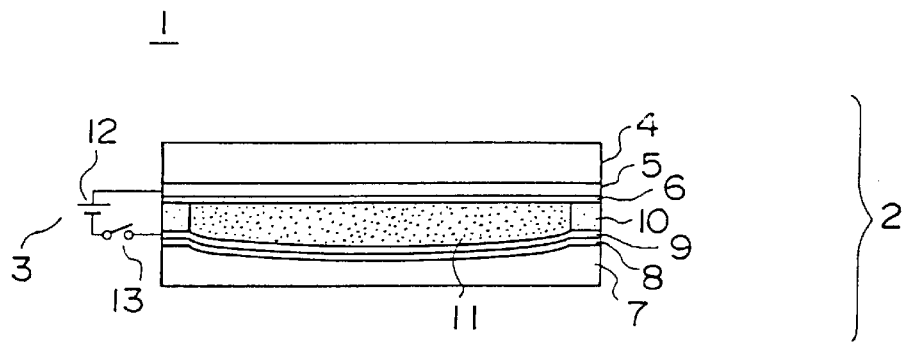
FIG. 7 is a cross-sectional view of the optical deflector device in FIG. 6.

FIGS. 6 and 7 show an optical deflector device in a first embodiment of the present invention. This optical deflector device utilizes a VGM (variable grating mode) cell in order to provide characteristics of a cylindrical lens having a variable focal length which is varied by electrically controlling the VGM cell.

Referring to FIGS. 6 and 7, the optical deflector device 1 includes a rectangular VGM cell 2 and a power supply unit 3. The VGM cell 2 includes a nematic liquid crystal material having characteristics to generate a voltage-controlled distribution of spatial frequencies in accordance with the electrical field applied to the VGM cell 2.

The power supply unit 3 generates an electrical field to which the VGM cell 2 is subjected. The power supply unit 3 includes a DC power source 12 and a switch 13.

In the above optical deflector device 1, the VGM cell 2 includes two transparent glass plates 4 and 7, each having parallel faces and a rectangular shape. The glass plate 4 includes a flat inner face, and the glass plate 7 includes an inner face with a curved concave portion which will be described in more detail later.

A transparent electrode 5 is continuously formed on the flat inner face of the glass plate 4, and an orientation layer 6 is formed on the transparent electrode 5. A transparent electrode 8 is continuously formed on the inner face of the glass plate 7, and an orientation layer 9 is formed on the transparent electrode 8.

The transparent electrodes 5 and 8 are made of a transparent conductive material such as indium-tin-oxide (ITO).

The distance between the inner faces of the two glass plates 4 and 7 is held by a spacer 10 at a predetermined distance. The spacer 10 is an annular member and it is inserted between the orientation layers 6 and 9 and arranged on the peripheral portions of the orientation layers 6 and 9.

A liquid crystal 11 is injected into an internal space between the glass plates 4 and 7. The liquid crystal 11 is made of a "nematic" liquid crystal material. The "nematic" liquid crystal material has characteristics to generate a distribution of spatial frequencies when subjected to an electric field. In the case of the nematic liquid crystal material, the dielectric constant of the liquid crystal molecules in the longitudinal axis becomes smaller than the dielectric constant of the liquid crystal molecules in the lateral direction when subjected to an electric field.

The inner face of the glass plate 7 has a curved concave portion, and the transparent electrode 8 and the orientation layer 9 are integrally formed with the inner face of the glass plate 7 along the curvature of the curved concave portion thereof. The film thickness of the liquid crystal 11 between the glass plates 4 and 7 is set by the glass plates 4 and 7 in accordance with a film thickness distribution defined by a predetermined function of a focal length of the transmitted rays and an incident point of each incident ray to the VGM cell.

One electrode of the DC power source 12 of the power supply unit 3 is connected to the transparent electrode 5 on the glass plate 4, and the other electrode of the DC power source 12 is connected to the transparent electrode 8 on the glass plate 7 via the switch 13.

The liquid crystal 11 of the VGM cell 2 is subjected to the electrical field which is generated by the power supply unit 3. The distribution of the spatial frequencies generated by the liquid crystal 11 is varied depending on the film thickness of the liquid crystal 11 and depending on the electrical field applied to the VGM cell 72.

The orientation layers 6 and 9 are processed such that the initial orientation direction is in accordance with a direction indicated by the arrow "A".

Figure 8:
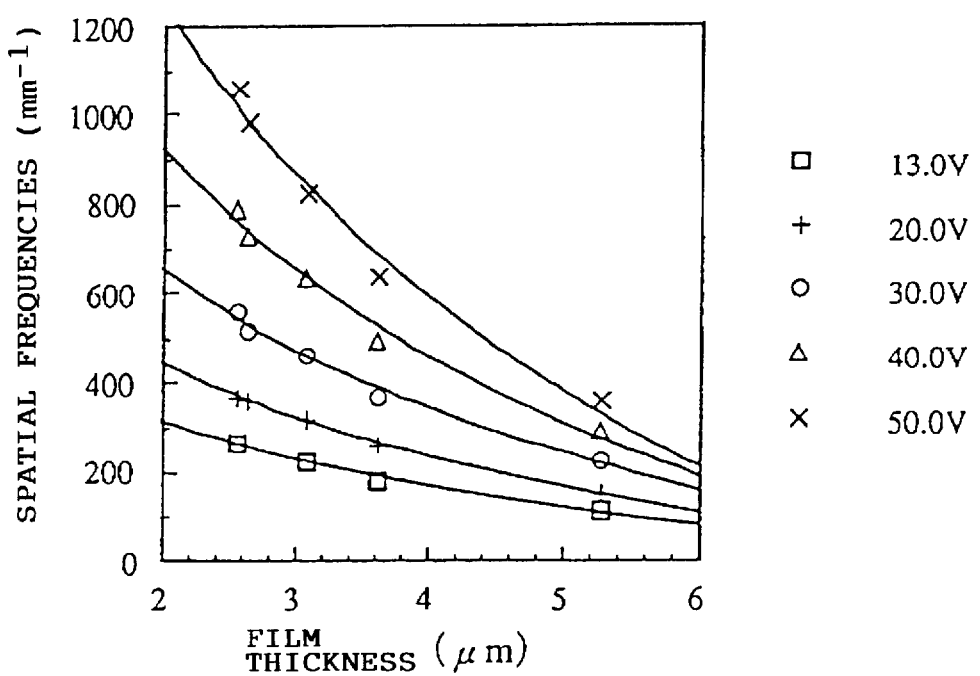
FIG. 8 is a chart of film-thickness vs. spatial-frequency characteristics of a VGM cell of the optical deflector device in FIG. 6.

FIG. 8 shows film-thickness vs. spatial-frequency characteristics of the VGM cell 2 of the optical deflector device 1 in the first embodiment. The characteristics of the VGM cell 2, as shown in FIG. 8, have been observed by varying the voltage supplied by the power supply unit 3, from 13.0 V to 50.0 V.

The characteristics of the VGM cell 2 show the relationship between the film thickness "t" of the crystal liquid 11 of the VGM cell 2 and the spatial frequency "f" thereof. This relationship is represented by $$f = a \cdot \log(t) + b \tag{1}$$

where a and b are constants which are determined depending on the applied voltage and the liquid crystal material.

As is apparent from the above formula, the spatial frequency "f" of the VGM cell 2 is gradually decreased as the film thickness "t" of the liquid crystal 11 is increased.

If the film thickness "t" of the liquid crystal 11 of the VGM cell 2 is continuously varied along the surface of the VGM cell 2, the spatial frequency "f" thereof can be continuously varied along the surface of the VGM cell 2.

In the optical deflector device 1, the film thickness of the liquid crystal 11 in the VGM cell 2 is set by the glass plates 4 and 7 in accordance with a film thickness distribution defined by a predetermined function comprising a variable indicating a focal length of the transmitted rays and a variable indicating a position of an incident point of each incident ray to the VGM cell 2. Thus, the optical deflector device 1 in the first embodiment can provide characteristics of a converging lens.

Figure 10:
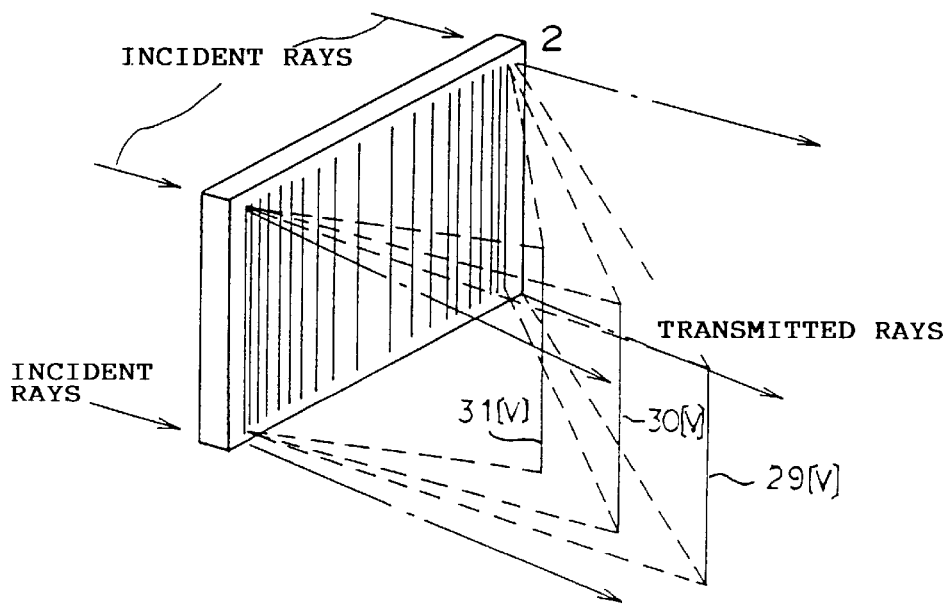
FIGS. 9 and 10 are diagrams for explaining an operation of the VGM cell of the optical deflector device in FIG. 6.
Figure 9:
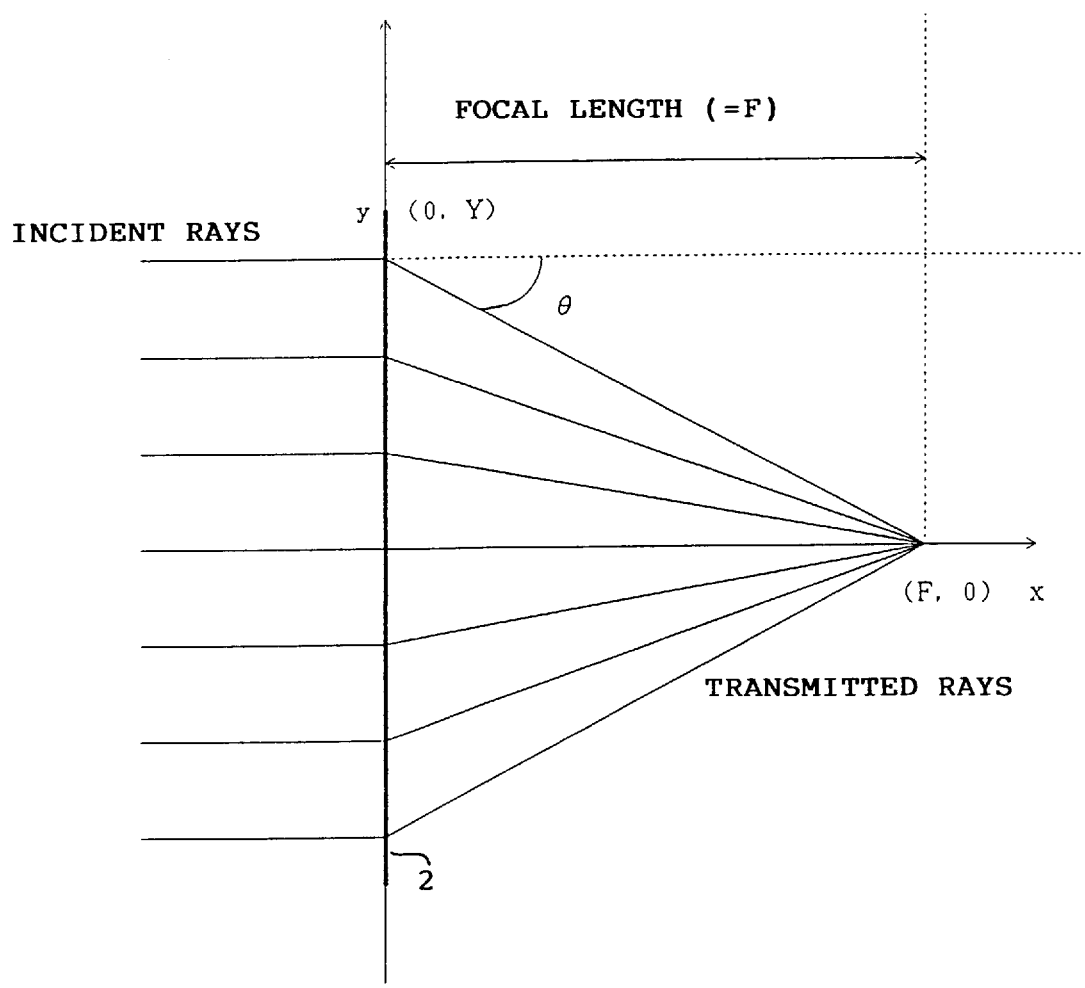

FIGS. 9 and 10 show an operation of the optical deflector device 1 in the first embodiment.

In FIG. 9, there is provided an x axis (a principal axis of the VGM cell 2) which passes through a focal point (F, 0) of the transmitted rays and the center of the VGM cell 2, and a y axis which is perpendicular to the x axis and passes through the center of the VGM cell 2. It is assumed that an incident ray, perpendicular to the y axis, enters the VGM cell 2 at an incident point (0, y) and is deflected by the VGM cell 2 at an angle θ to the incident ray. The incident rays are deflected by the VGM cell 2 at different angles so that they are directed to the focal point. The transmitted rays from the VGM cell 2 converge at the focal point (F, 0). The focal length of the VGM cell 2 indicates a distance (=F) from the center of the VGM cell 2 to the focal point.

In the case of FIG. 9, the incident rays and the transmitted rays meet the formula sin θ=f·λ. Therefore, the spatial frequency "f" is represented by $$f = y/\lambda \cdot \sqrt{(F^2+y^2)} \tag{2}$$

From the formulas (1) and (2), $$\log(t) = (1/a) \cdot (y/\lambda \cdot \sqrt{(F^2+y^2)} + b) \tag{3}$$

Thus, the film thickness "t" of the liquid crystal 11 at the point (0, y) on the VGM cell 2 is represented by $$t = \exp[(1/a) \cdot (y/\lambda \cdot \sqrt{(F^2+y^2)} + b)] \tag{4}$$

where a and b are constants which are determined depending on the applied voltage and the liquid crystal material.

In the formula (4) above, the function "t" comprises a variable indicating the focal length (F) of the transmitted rays and a variable indicating a position (y) of an incident point of each incident ray to the VGM cell. Also, λ indicates a wavelength of the incident rays, F indicates a distance between the center of the VGM cell and the focal point of the transmitted rays, and y indicates the position of the incident point of each incident ray to the VGM cell with respect to the x axis.

In the first embodiment, as described above, the film thickness of the liquid crystal 11 is set by the glass plates 4 and 7 in accordance with the film thickness distribution defined by the formula (4) above. When subjected to an electric field above a predetermined threshold value, the VGM cell 2 generates a distribution of spatial frequencies in accordance with the electric field.

As shown in FIG. 10, the optical deflector device 1 including the VGM cell 2 is capable of realizing the characteristics of a cylindrical lens device wherein the transmitted rays from the VGM cell 2 converge at the focal point.

As it is apparent from the charts of FIG. 8, if the film thickness "t" for each of different values of the applied voltage is assumed to be the same, the spatial frequency "f" is proportionally increased as the value of the applied voltage is increased.

Assuming that the film thickness of the liquid crystal 11 is set by the glass plates 4 and 7 in accordance with the film thickness distribution defined by the formula (4) above, the distribution of the spatial frequencies generated by the VGM cell 2 can be modified by varying the electric field applied to the VGM cell 2. If the distribution of the spatial frequencies generated by the VGM cell 2 is modified, the deflection directions of the transmitted rays relative to the incident rays are also modified. Therefore, the focal length of the transmitted rays from the VGM cell 2 is controllable by varying the electric field applied to the VGM cell 2.

For example, as shown in FIG. 10, the focal length of the transmitted rays from the VGM cell 2 can be slightly changed by varying the applied voltage from the power supply unit 3 to 29 V, 30 V and 31 V. When the applied voltage from the power supply unit 3 is cut by turning the switch 13 off, the distribution of the spatial frequencies is not produced by the VGM cell 2 so that the transmitted rays from the VGM cell 2 are not deflected and parallel, as indicated by dotted chain lines in FIG. 10.

Figure 11:
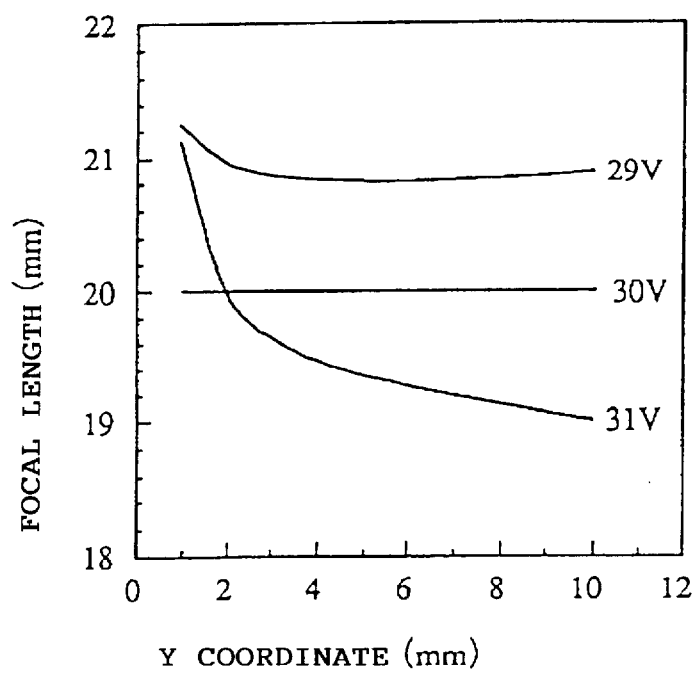
FIG. 11 is a chart of applied-voltage vs. focal-length characteristics of another VGM cell in the first embodiment.

FIG. 11 shows an operation of a VGM cell which is designed to have an aperture diameter of 20 mm and a focal length of 20 mm at the applied voltage of 30 V. When the applied voltage is varied to 29 V and 31 V, the focal length of the transmitted rays from the VGM cell is changed as shown in FIG. 11.

As shown in FIG. 11, when the applied voltage from the power supply unit is varied from 30 V to 29 V, the focal length of the transmitted rays from the VGM cell is increased from 20 mm to about 21 mm. The distance of a focal point at 29 V from the VGM cell is greater than the distance of the previous focal point at 30 V. When the applied voltage is varied from 30 V to 31 V, the focal length of the transmitted rays from the VGM cell is decreased from 20 mm to about 19 mm. Aberration may take place with respect to the transmitted rays from central portions of the VGM cell near the center of the VGM cell. The focal length of the transmitted rays from the other portions of the VGM cell is approximately 19 mm when the applied voltage is 31 V. Accordingly, the above operation of the VGM cell makes it possible to provide the characteristics of a converging lens device having a variable focal length.

Next, a description will be given of an optical deflector device in a second embodiment of the present invention.

Figure 12:
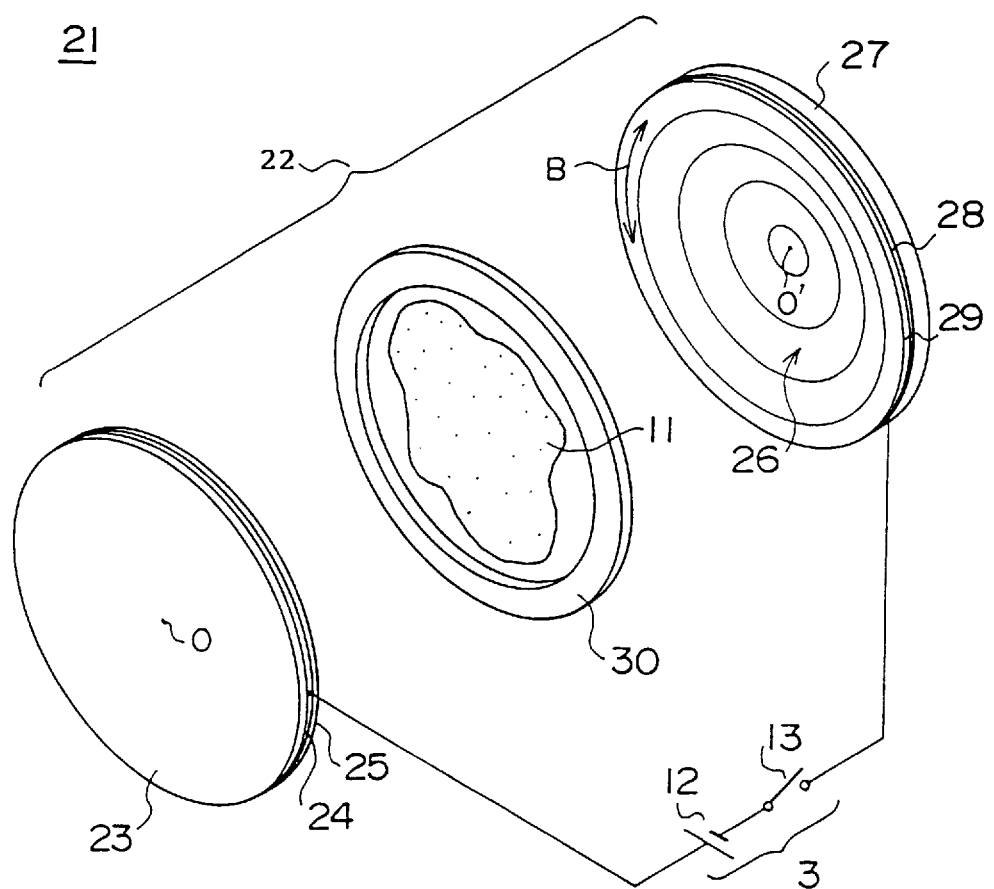
FIG. 12 is a perspective exploded view of an optical deflector device in a second embodiment of the present invention.
Figure 13:
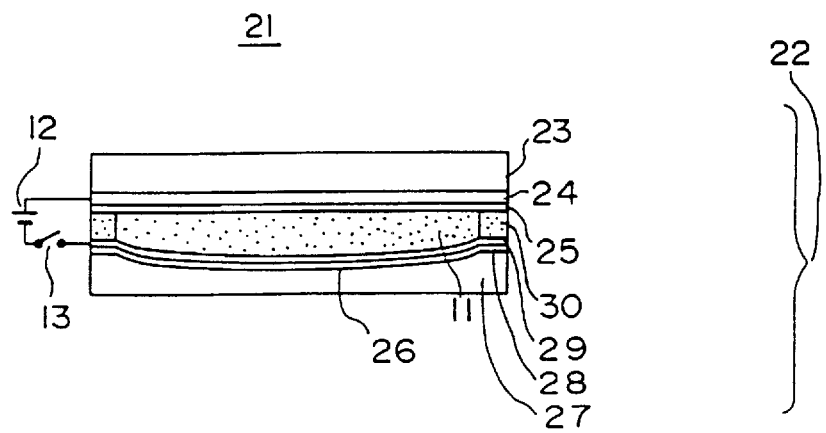
FIG. 13 is a cross-sectional view of the optical deflector device in FIG. 12.

FIGS. 12 and 13 show an optical deflector device 21 in the second embodiment of the present invention. In FIGS. 12 and 13, the elements which are the same as corresponding elements in FIGS. 6 and 7 are designated by the same reference numerals, and a description thereof will be omitted.

Referring to FIGS. 12 and 13, the optical deflector device 21 includes a circular VGM cell 22 and the power supply unit 3. The VGM cell 22 generates a voltage-controlled distribution of spatial frequencies in accordance with the electrical field applied to the VGM cell 22.

In the above optical deflector device 21, the VGM cell 22 includes two transparent glass plates 23 and 27, each having parallel faces and a circular shape. The glass plate 23 includes a flat inner face, and the glass plate 27 includes an inner face with a curved concave portion 26. The curved concave portion 26 is arranged coaxially with the center of the glass plate 27.

A transparent electrode 24 is continuously formed on the flat inner face of the glass plate 23, and an orientation layer 25 is formed on the transparent electrode 24. A transparent electrode 28 is continuously formed on the inner face of the glass plate 27, and an orientation layer 29 is formed on the transparent electrode 28.

The transparent electrodes 24 and 28 are made of a transparent conductive material such as indium-tin-oxide (ITO).

The distance between the inner faces of the two glass plates 23 and 27 is held by a spacer 30 at a predetermined distance. The spacer 30 is an annular member and it is placed between the orientation layers 25 and 29 and arranged on the peripheral portions of the orientation layers 25 and 29. The liquid crystal 11 is injected into an internal space between the glass plates 23 and 27. The liquid crystal 11 is made of the "nematic" liquid crystal material.

The transparent electrode 28 and the orientation layer 29 are integrally formed with the inner face of the glass plate 27 along the curvature of the curved concave portion 26. The film thickness of the liquid crystal 11 between the glass plates 23 and 27 is set by the glass plates 23 and 27 in accordance with a film thickness distribution defined by a predetermined function.

One electrode of the DC power source 12 of the power supply unit 3 is connected to the transparent electrode 24 on the glass plate 23, and the other electrode of the DC power source 12 is connected to the transparent electrode 28 on the glass plate 27 via the switch 13.

The liquid crystal 11 of the VGM cell 21 is subjected to the electrical field which is generated by the power supply unit 3. The distribution of the spatial frequencies is varied depending on the film thickness of the liquid crystal 11 and depending on the electrical field applied to the VGM cell 22.

The orientation layers 25 and 29 are processed such that the initial orientation direction is in accordance with a circumferential direction indicated by the arrow "B" in FIG. 12.

Figure 14A:
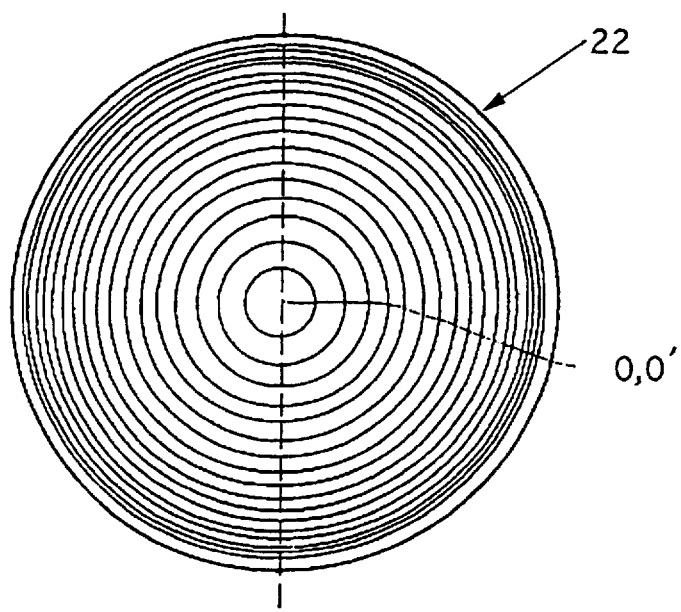
FIGS. 14A and 14B are diagrams for explaining radial-distance vs. spatial-frequency characteristics of a VGM cell of the optical deflector device in FIG. 12.
Figure 14B:
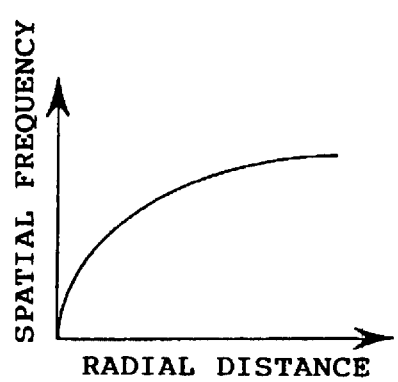
Figure 15:
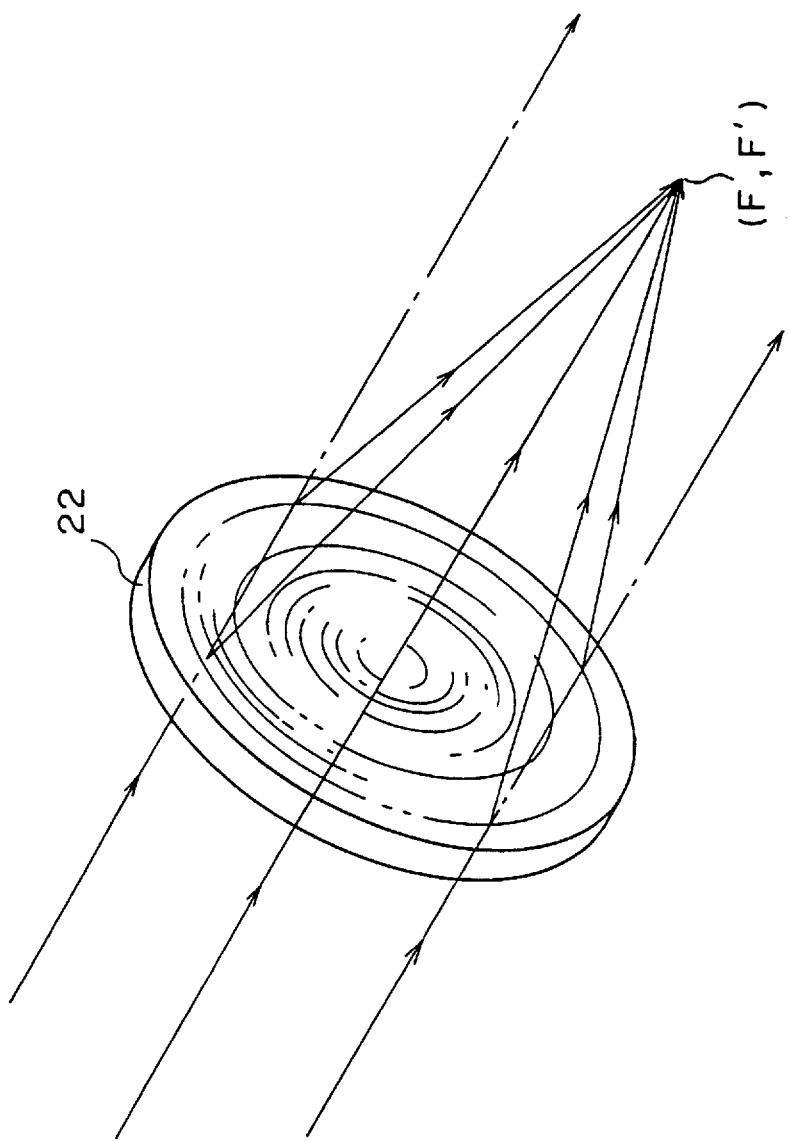
FIG. 15 is a diagram for explaining an operation of the VGM cell of the optical deflector device in FIG. 12.

FIGS. 14A, 14B and 15 show operations of the optical deflector device 21 in the second embodiment. In the optical deflector device 21, the curved concave portion 26 of the inner face of the glass plate 27 has a spherical curvature. A distribution of the film thickness of the liquid crystal 11 in the VGM cell 21 is set substantially in accordance with the spherical curvature of the glass plate 27.

As the distribution of the film thickness of the liquid crystal 11 in the VGM cell 21 is set in accordance with the spherical curvature of the glass plate 27, it makes it possible that the spatial frequencies are increased as the radial distance from the center of the glass plates 23 and 27 becomes greater, as shown in FIG. 14B. FIG. 14A shows such a distribution of the spatial frequencies on the VGM cell 22.

In the VGM cell 22, a diffraction angle when the incident rays enter the peripheral portion of the liquid crystal 11 can be the greatest. As shown in FIG. 15, the VGM cell 22 of the optical deflector device 21 can provide characteristics of a converging lens if the distribution of the film thickness of the liquid crystal 11 included in the VGM cell 22 is set in accordance with a film thickness distribution defined by the predetermined function represented by the above formula (4).

Figure 16:
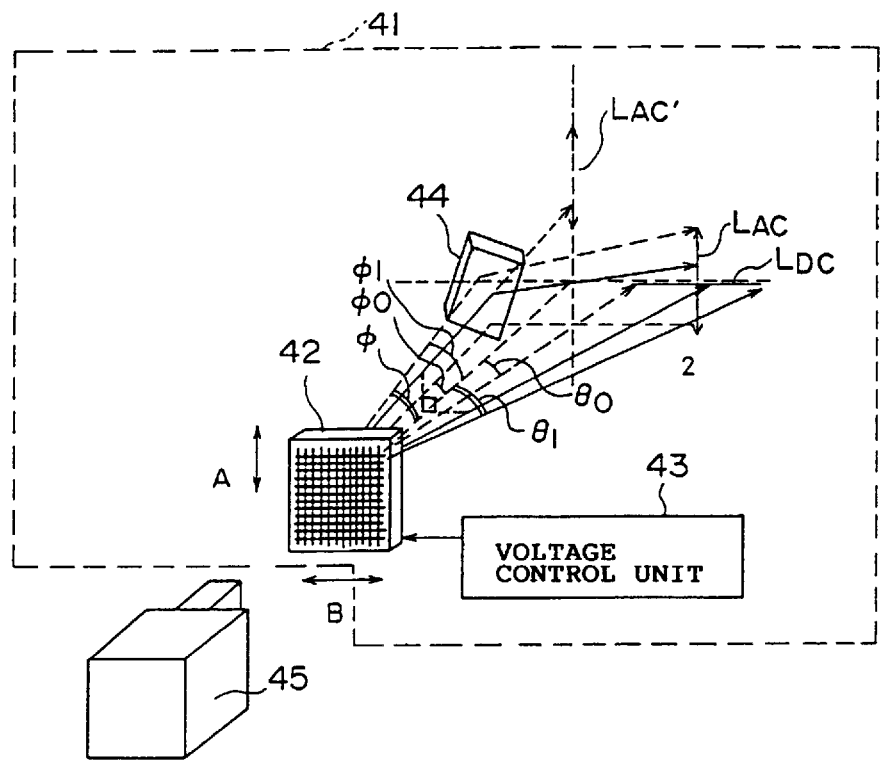
FIG. 16 is a diagram of an optical deflector device in a third embodiment of the present invention.

FIGS. 16 and 17 show an optical deflector device 41 in a third embodiment of the present invention. This optical deflector device 41 is constructed to carry out a multi-directional scanning with the transmitted rays from a VGM cell by electrically controlling the VGM cell.

Referring to FIG. 16, the optical deflector device 41 includes a rectangular VGM cell 42, a voltage control unit 43, a deflecting mirror 44, and a light source 45.

The VGM cell 42 includes a "nematic" liquid crystal material having characteristics to generate a distribution of spatial frequencies when subjected to an electric field.

The voltage control unit 43 selectively generates one of a DC-excited field and an AC-excited field, which is applied to the VGM cell 42. The deflecting mirror 44 deflects the deflected rays from the VGM cell 42 to a predetermined position. More specifically, the mirror 44 in this embodiment is located to reflect the rays deflected by the VGM cell 42 when subjected to the AC-excited field, so that a range of scanning with respect to the deflected rays from the VGM cell 42, not deflected by the deflecting mirror 44 when the VGM cell 42 is subjected to the DC-excited field, and a range of scanning with respect to the deflected rays from the deflecting mirror 44 substantially overlap each other.

The light source 45 supplies parallel rays which are incident to the VGM cell 42 at right angles to the surface of the VGM cell 42.

The VGM cell 42 includes a liquid crystal which is made of a homogeneous-orientation-type or planar-orientation-type nematic liquid crystal material. When subjected to a DC-excited field above a threshold value, "diffraction" patterns which are parallel to the initial orientation direction (or in the direction "A") are produced by the VGM cell 42. The incident rays which enter the VGM cell 42 at this time are deflected in a direction parallel to the X direction. On the other hand, when subjected to an AC-excited field above the threshold value, "diffraction" patterns which are perpendicular to the initial orientation direction (or in the direction "B") are produced by the VGM cell 42. The incident rays which enter the VGM cell 42 at this time are deflected in a direction parallel to the Y direction.

Referring to FIG. 17, the VGM cell 42 includes two transparent glass plates 46 and 49, each having parallel faces and a rectangular shape. The glass plate 46 includes a flat inner face, and the glass plate 49 includes an inner face with a curved concave portion.

A transparent electrode 47 is continuously formed on the flat inner face of the glass plate 46, and an orientation layer 48 is formed on the transparent electrode 47. A transparent electrode 50 is continuously formed on the inner face of the glass plate 49, and an orientation layer 51 is formed on the transparent electrode 50.

The transparent electrodes 47 and 49 are made of a transparent conductive material such as indium-tin-oxide (ITO).

The distance between the inner faces of the two glass plates 46 and 49 is held by a spacer 52 at a predetermined distance. The spacer 52 is a rectangular, frame-like member and it is inserted between the orientation layers 48 and 51 such that it is arranged on the peripheral portions of the orientation layers.

A liquid crystal 53 is injected into an internal space between the glass plates 46 and 49. The liquid crystal 53 is made of the above-mentioned "nematic" liquid crystal material.

The orientation layers 48 and 51 are processed such that the initial orientation direction is in accordance with the direction "A".

Electrodes from the voltage control unit 43 are connected to the transparent electrodes 47 and 50, and the voltage control unit 43 supplies the DC voltage or the AC voltage to the liquid crystal 53 of the VGM cell 42 via the connections.

The inner face of the glass plate 49 has the curved concave portion, and the transparent electrode 50 and the orientation layer 51 are integrally formed with the inner face of the glass plate 49 along the curvature of the curved concave portion thereof. The thickness of the film of the liquid crystal 53 is set by the glass plates 46 and 49 in accordance with a film thickness distribution defined by the above formula (4).

The liquid crystal 53 of the VGM cell 42 is subjected to one of the DC-excited field and the AC-excited field which is selectively generated by the voltage control unit 43. The distribution of the spatial frequencies is varied depending on the electrical field applied to the VGM cell 72. The deflection directions of the rays from the VGM cell 42 to the incident rays are varied if the distribution of the spatial frequencies by the VGM cell 42 are changed.

When the liquid crystal 53 of the VGM cell 42 is subjected to the DC-excited field above the threshold value, the incident rays entering the VGM cell 42 are deflected in parallel to the X direction. Thus, it is possible to carry out the scanning in the X direction with the transmitted rays at this time. When subjected to the AC-excited field above the threshold value, the incident rays entering the VGM cell 42 are deflected in parallel to the Y direction. Thus, it is possible to carry out the scanning in the Y direction with the transmitted rays at this time.

Figure 18:
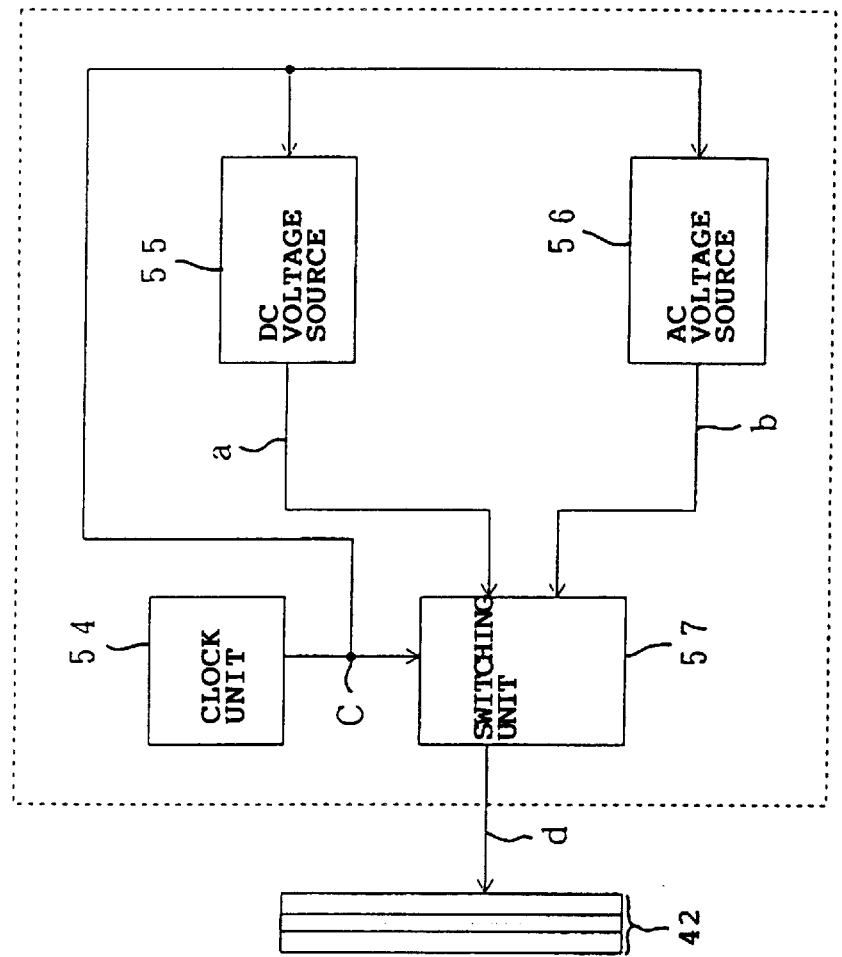
FIG. 18 is a diagram of a voltage control unit of the optical deflector device in FIG. 16.

FIG. 18 shows the voltage control unit 43 of the optical deflector device 41 in FIG. 16.

Referring to FIG. 18, the voltage control unit 43 includes a clock unit 54, a DC voltage source 55, an AC voltage source 56, and a switching unit 57. The clock unit 54 generates a clock signal which is transmitted to the elements 55, 56 and 57 to synchronize operations of the elements 55, 56 and 57. The clock unit 54 has an output (indicated by "c" in FIG. 18) which is connected to each of the elements 55, 56 and 57.

The DC voltage source 55 generates a DC voltage signal having a triangular waveform in synchronism with the clock signal from the clock unit 54. The AC voltage source 56 generates an AC voltage signal in synchronism with the clock signal from the clock unit 54, the AC voltage signal having a waveform that is substantially the same as the triangular waveform of the DC voltage signal.

The switching unit 57 has a DC input connected to an output (indicated by "a" in FIG. 18) of the DC voltage source 55, an AC input connected to an output (indicated by "b" in FIG. 18) of the AC voltage source 56, and a voltage output (indicated by "d" in FIG. 18) connected to the VGM cell 42. The switching unit 57 performs a switching in synchronism with the clock signal from the clock unit 54, wherein the DC input and the AC input are alternately connected to the voltage output of the switching unit 57 according to the clock signals sent from the clock unit 54. Thus, by using this operation of the switching unit 57, the DC voltage from the DC voltage source 55 and the AC voltage from the AC voltage source 56 are alternately applied to the VGM cell 42 in accordance with the clock signals sent from the clock unit 54.

Figure 19:
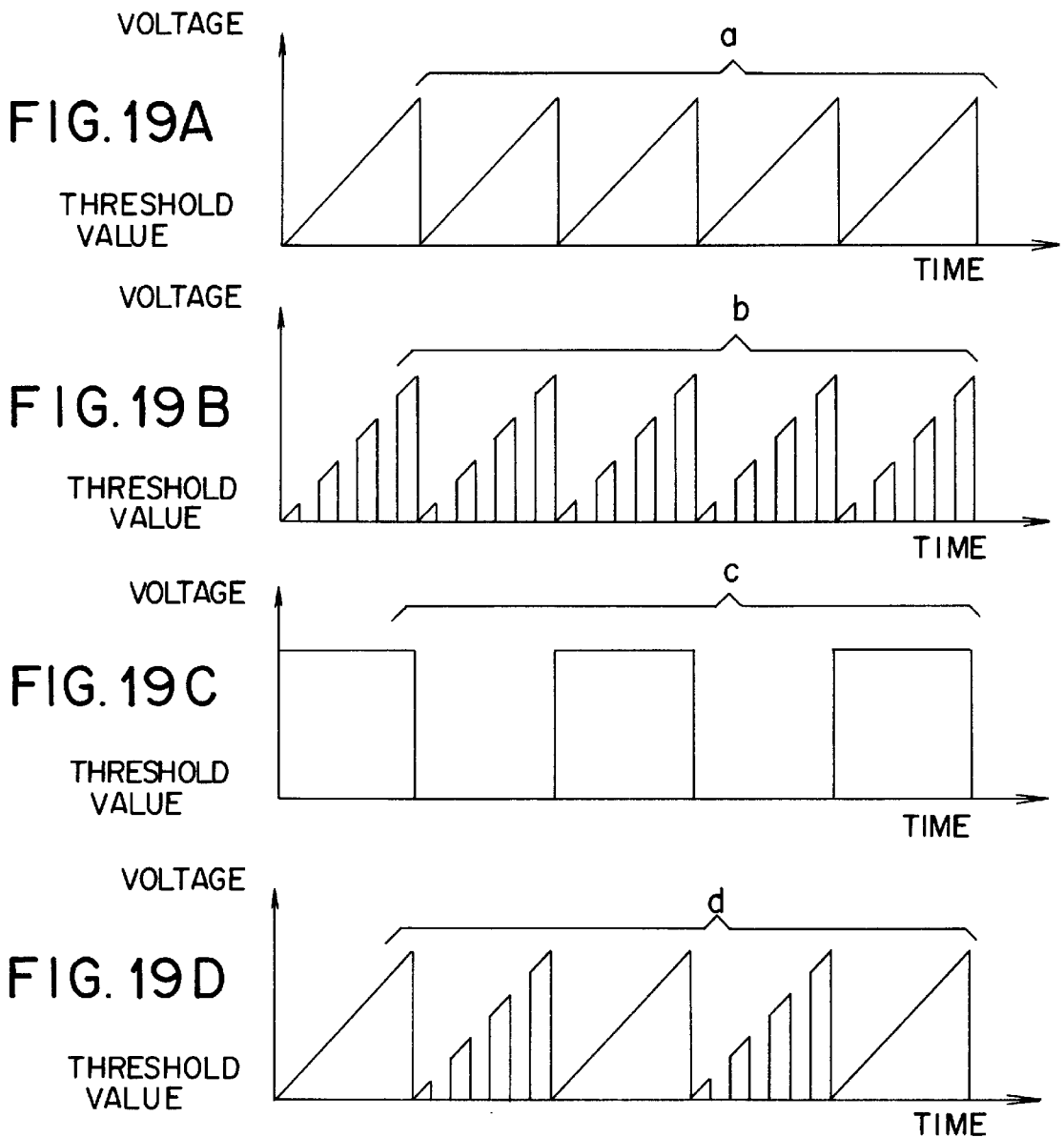
FIGS. 19A through 19D are charts for explaining operations of the voltage control unit in FIG. 18.

FIGS. 19A through 19D show operations of the voltage control unit 43 in FIG. 18. FIG. 19A shows a waveform of the DC voltage signal at the output "a" of the DC voltage source 55. FIG. 19B shows a waveform of the AC voltage signal at the output "b" of the AC voltage source 56. FIG.

19C shows a waveform of the clock signal at the output "c" of the clock unit 54. FIG. 19D shows a waveform of the voltage signal at the voltage output "d" of the switching unit 57.

The DC voltage source 55 outputs the DC voltage signal to the switching unit 57 in accordance with the clock signals from the clock unit 54. The DC voltage signal has the triangular waveform shown in FIG. 19A, and the DC voltage indicated by the DC voltage signal proportionally increases and abruptly drops but is always greater than a predetermined threshold value.

The AC voltage source 56 outputs the AC voltage signal to the switching unit 57 in accordance with the clock signals from the clock unit 54. The AC voltage signal has a waveform that is substantially the same as the triangular waveform of the DC voltage signal, and, as shown in FIG. 19B, the AC voltage indicated by the AC voltage signal intermittently rises and drops in the alternating manner but is always greater than the predetermined threshold value.

The switching unit 57 outputs the DC voltage signal to the VGM cell 42 when the clock signal from the clock unit 54 is at a high level, and outputs the AC voltage signal to the VGM cell 42 when the clock signal from the clock unit 54 is at a low level, as shown in FIG. 19C.

Accordingly, the voltage signal output from the switching unit 57 to the VGM cell 42 is as shown in FIG. 19D, and the DC voltage signal from the DC voltage source 55 and the AC voltage signal from the AC voltage source 56 are alternately output to the VGM cell 42. Therefore, by using the voltage control unit 43, the VGM cell 42 is subjected to one of the DC-excited field and the AC-excited field alternately.

Referring back to FIG. 16, when the VGM cell 42 is subjected to the DC-excited field, "diffraction" patterns in a direction (indicated by an arrow "B" in FIG. 16) at right angles to the initial orientation direction "A" are produced in the liquid crystal 53 of the VGM cell 42. The incident rays at this time are deflected by the VGM cell 42 in parallel to the direction "B". The DC voltage which is increased from the threshold value to a maximum peak according to the triangular waveform, as shown in FIG. 19A, is applied to the VGM cell 42, and a deflection angle θ of the deflected rays to the incident rays is increased from $\theta_0$ at the threshold value to $\theta_1$ at the maximum peak accordingly.

In FIG. 16, the range of scanning with respect to the deflected rays from the VGM cell 42 when subjected to the DC-excited field is indicated by an arrow "LDC".

When the VGM cell 42 is subjected to the AC-excited field, "diffraction" patterns in a direction parallel to the initial orientation direction "A" are produced in the liquid crystal 53 of the VGM cell 42. The incident rays at this time are deflected by the VGM cell 42 in parallel to the initial orientation direction "A". The AC voltage, whose amplitude is substantially increased from the threshold value to the maximum peak, as shown in FIG. 19B, is applied to the VGM cell 42, and a deflection angle Φ of the deflected rays to the incident rays is increased from $\Phi_0$ at the threshold value to $\Phi_1$ at the maximum peak accordingly.

In FIG. 16, the range of scanning with respect to the deflected rays from the VGM cell 42 when subjected to the AC-excited field is as indicated by an arrow "LAC'". Since the deflecting mirror 44 deflects the deflected rays from the VGM cell 42 when subjected to the AC-excited field, the range of scanning with respect to the deflected rays from the deflecting mirror 44 is as indicated by an arrow "LAC". Accordingly, the range "LAC" of scanning with respect to the deflected rays from the deflecting mirror 44 and the range "LDC" of scanning with respect to the other deflected rays from the VGM cell 42, not deflected by the mirror 44, substantially overlap each other.

Figure 20:
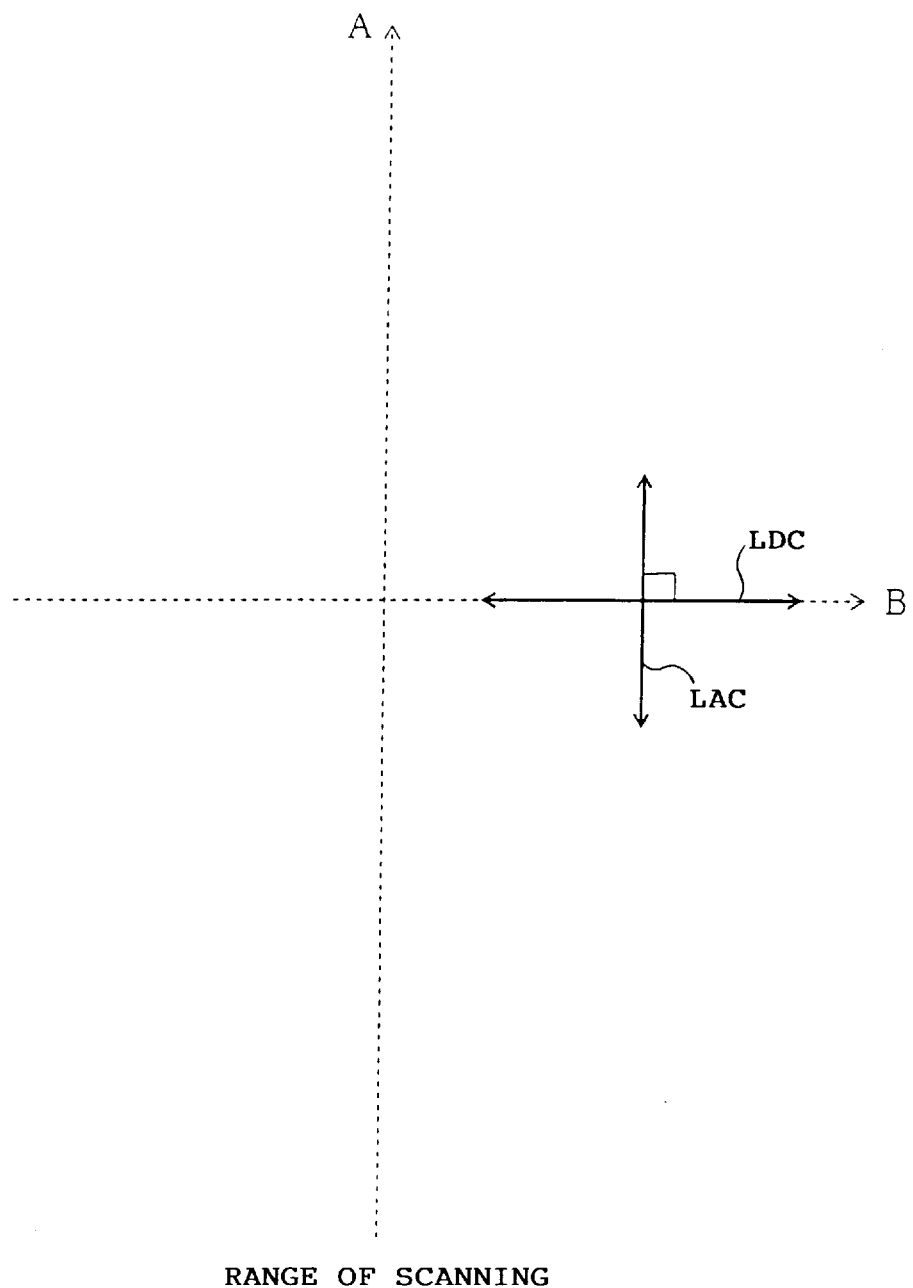
FIG. 20 is a diagram for explaining an operation of the optical deflector device in FIG. 16.

FIG. 20 shows the above-described operation of the optical deflector device 41 in FIG. 16. In the optical deflector device 41, by utilizing the VGM cell 42, the voltage control unit 43 and the deflecting mirror 44, it is possible to carry out a two-directional scanning with the deflected rays deflected by the deflecting mirror 44 when subjected to the AC-excited field and the other deflected rays from the VGM cell 42 when subjected to the DC-excited field. In addition, a scanning line in the direction "A" and a scanning line in the direction "B" intersect each other at right angles at the center of each of the ranges of scanning.

The optical deflector device 41 does not require use of a moving unit for performing the two-directional scanning. The optical deflector device 41 in the third embodiment is capable of carrying out the two-directional scanning with good reliability by utilizing the deflecting mirror 44 and the voltage control unit 43 in addition to the VGM cell 42.

In the above-described third embodiment, size of the deflecting mirror 44 is determined such that it covers a range of scanning with the 1st-order diffraction rays passed through the VGM cell 42. The 0th-order and 2nd-order diffraction rays passed through the VGM cell 42 are not deflected by the deflecting mirror 44 and not used for two-directional scanning.

In addition, in the above-described third embodiment, the deflecting mirror 44 may be either a total-reflection mirror or a half-reflection mirror. When a half-reflection mirror is used, a ray transmitted through the half-reflection mirror is reflected by a mirror so that the reflected ray is used to perform scanning in a different direction.

Figure 21A:
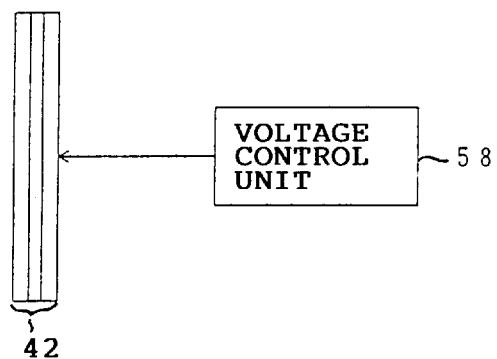
FIGS. 21A and 21B are diagrams for explaining an operation of another voltage control unit in the third embodiment.
Figure 21B:
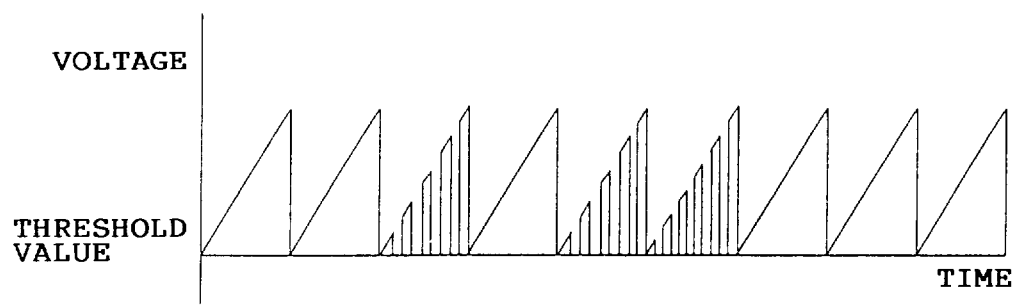

FIGS. 21A and 21B show an operation of another voltage control unit in the third embodiment. FIG. 21A shows a voltage control unit 58 which is different from the voltage control unit 42. FIG. 21B shows a waveform of a voltage signal supplied by the voltage control unit 58 to the VGM cell 42.

Referring to FIG. 21A, the voltage control unit 58 generates at random one of the DC-excited field and the AC-excited field, which is applied to the liquid crystal 53 of the VGM cell 42.

As shown in FIG. 21B, one of a DC voltage signal and an AC voltage signal from the voltage control unit 58 is output at random to the VGM cell 42. Therefore, by using the voltage control unit 58, the VGM cell 42 is subjected to the DC-excited field or the AC-excited field at random.

By using the voltage control unit 58, a switching unit such as the switching unit 57 is not required to construct the optical deflector device 41 in the third embodiment.

Figure 22:
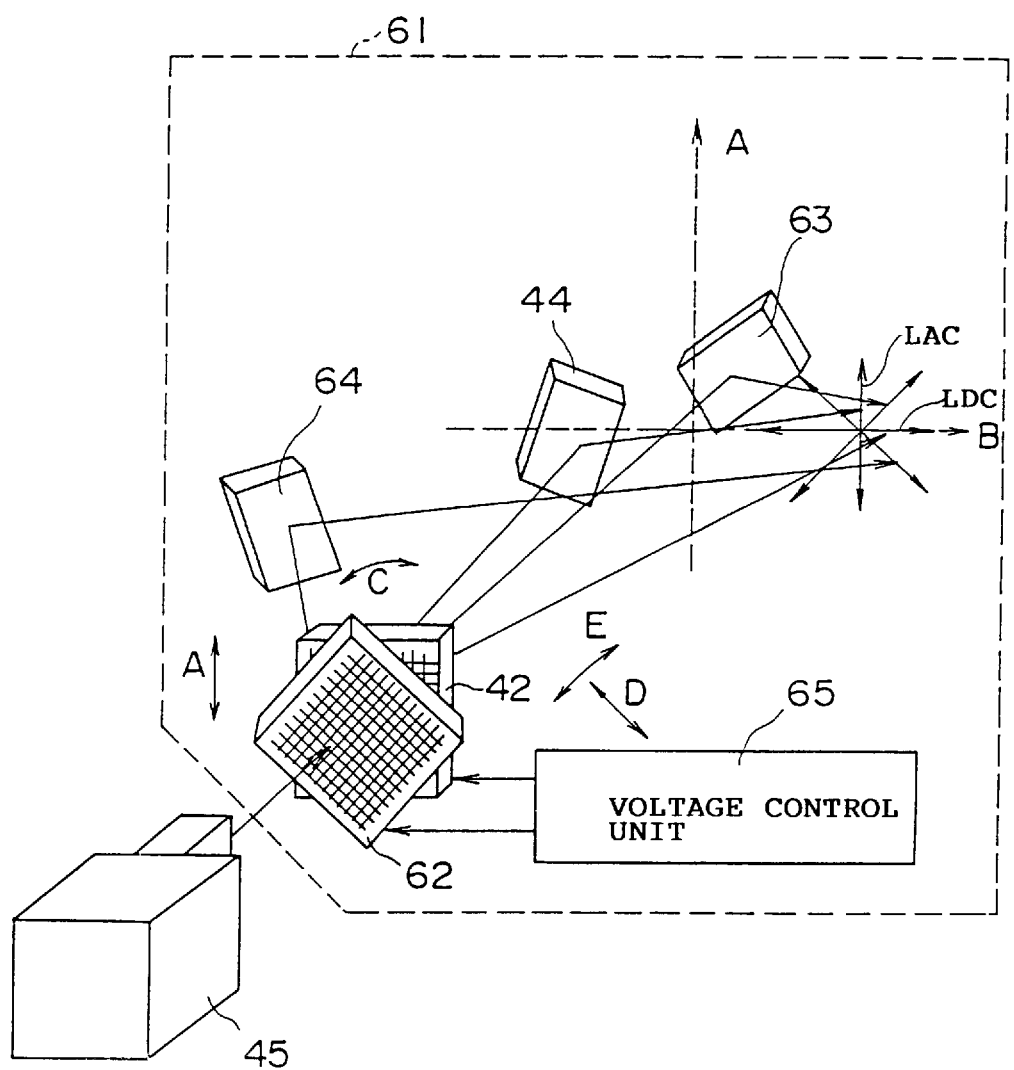
FIG. 22 is a diagram of an optical deflector device in a fourth embodiment of the present invention.

FIG. 22 shows an optical deflector device 61 in a fourth embodiment of the present invention. In FIG. 22, the elements which are the same as corresponding elements in FIG. 16 are designated by the same reference numerals, and a description thereof will be omitted.

Referring to FIG. 22, the optical deflector device 61 includes an additional VGM cell 62, a first deflecting mirror 63, and a second deflecting mirror 65 in addition to the VGM cell 42, the deflecting mirror 44, and the light source 45 which are included in the optical deflector device 41 in the third embodiment. Further, in the fourth embodiment, a voltage control unit 65 is provided to alternately generate a DC-excited field and an AC-excited field, which is applied to the VGM cell 42 and the VGM cell 62 in a controlled sequence.

The additional VGM cell 62 is arranged at 45 degrees to the initial orientation direction "A" of the VGM cell 42. The first and second deflecting mirrors 63 and 64 deflect all the deflected rays from the VGM cell 62 at a predetermined position, so that a range of scanning with respect to the deflected rays from the additional deflecting mirrors 63 and 64, the range of scanning with respect to the deflected rays from the deflecting mirror 44, and the range of scanning with respect to the deflected rays from the VGM cell 42 substantially overlap one another.

The additional VGM cell 62 has the same construction as the VGM cell 42, and a description thereof will be omitted. Also, each of the deflecting mirrors 63 and 64 has the same construction as the deflecting mirror 44, and a description thereof will be omitted.

Figure 23:
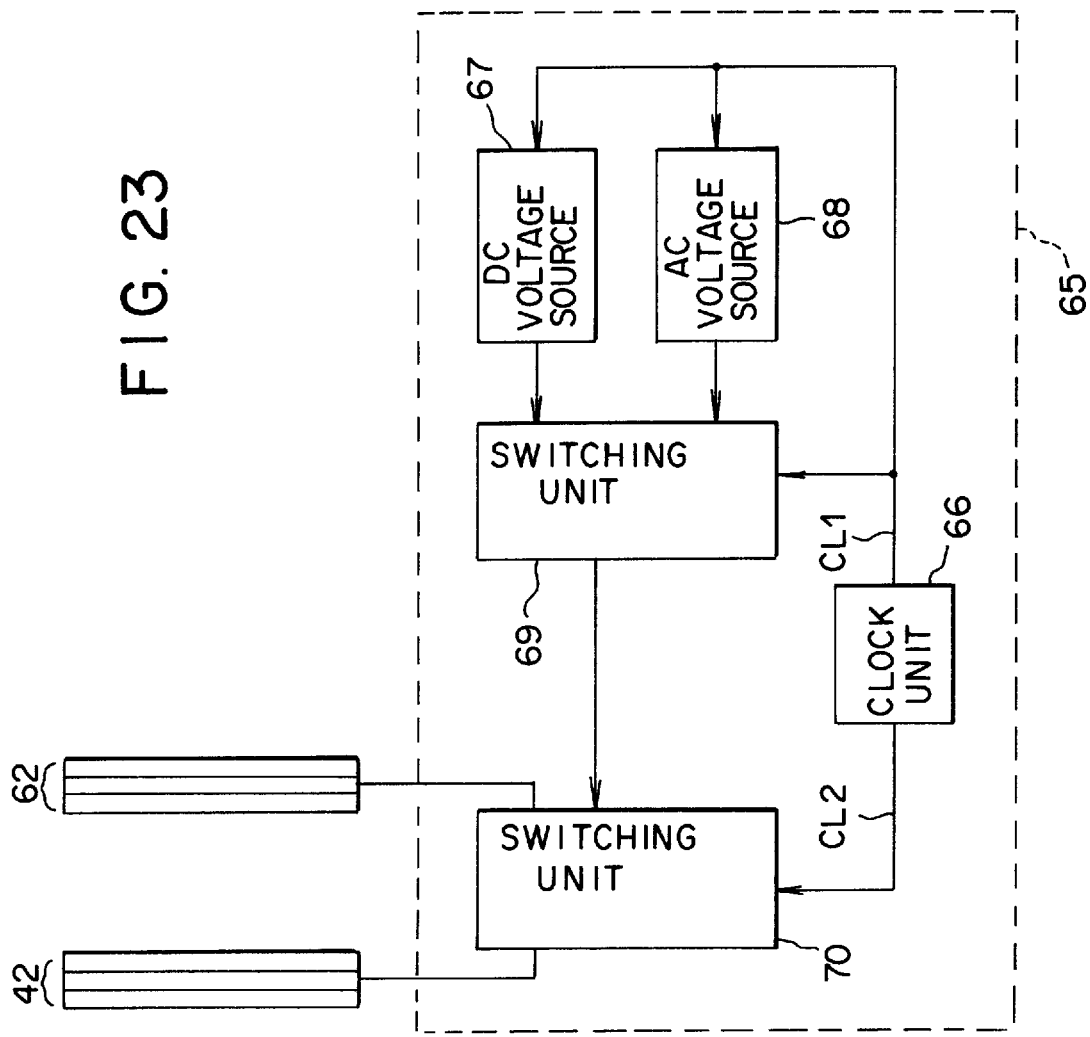
FIG. 23 is a diagram of a voltage control unit of the optical deflector device in FIG. 22.

FIG. 23 shows the voltage control unit 65 of the optical deflector device in FIG. 22.

Referring to FIG. 23, the voltage control unit 65 includes a clock unit 66, a DC voltage source 67, an AC voltage source 68, a switching unit 69, and a switching unit 70. The clock unit 66 generates a clock signal which is transmitted to the elements 67, 68, 69 and 70 to synchronize operations of the elements 67, 68, 69 and 70. The clock unit 66 has a first output (indicated by "CL1") connected to each of the elements 67, 68 and 69, and a second output (indicated by "CL2") connected to the element 70. From the first output "CL1", the clock unit 66 outputs a first clock signal CL1 to the elements 67–69. From the second output "CL2", the clock unit 66 outputs a second clock signal CL2 to the element 70. A period of the second clock signal CL2 is twice as great as a period of the first clock signal CL1.

The DC voltage source 67 generates a DC voltage signal having a triangular waveform in synchronism with the first clock signal CL1 from the clock unit 66. The AC voltage source 68 generates an AC voltage signal in synchronism with the clock signal CL1 from the clock unit 66, the AC voltage signal having a waveform that is substantially the same as the triangular waveform of the DC voltage signal.

The switching unit 69 has a DC input connected to an output of the DC voltage source 67, an AC input connected to an output of the AC voltage source 68, and an output connected to an input of the switching unit 70. The switching unit 69 performs a switching in synchronism with the first clock signal CL1 from the clock unit 66, wherein the DC input and the AC input are alternately connected to the output of the switching unit 69 according to the first clock signal CL1. By using this operation of the switching unit 69, the DC voltage from the DC voltage source 67 and the AC voltage from the AC voltage source 68 are alternately supplied to the input of the switching unit 70 in accordance with the first clock signal CL1 from the clock unit 66.

The switching unit 70 has a clock input connected to the second output "CL2" of the clock unit 66, a voltage input connected to the output of the switching unit 69, a first output connected to the VGM cell 42, and a second output connected to the additional VGM cell 62. The switching unit 70 performs a switching in synchronism with the second clock signal CL2 from the clock unit 66, wherein the voltage input is connected to one of the first output and the second output alternately, according to the second clock signal CL2. Thus, the DC or AC voltage signal from the switching unit 69 is supplied to one of the VGM cell 42 and the additional VGM cell 62 alternately according to the second clock signal CL2 from the clock unit 66.

Figure 24:
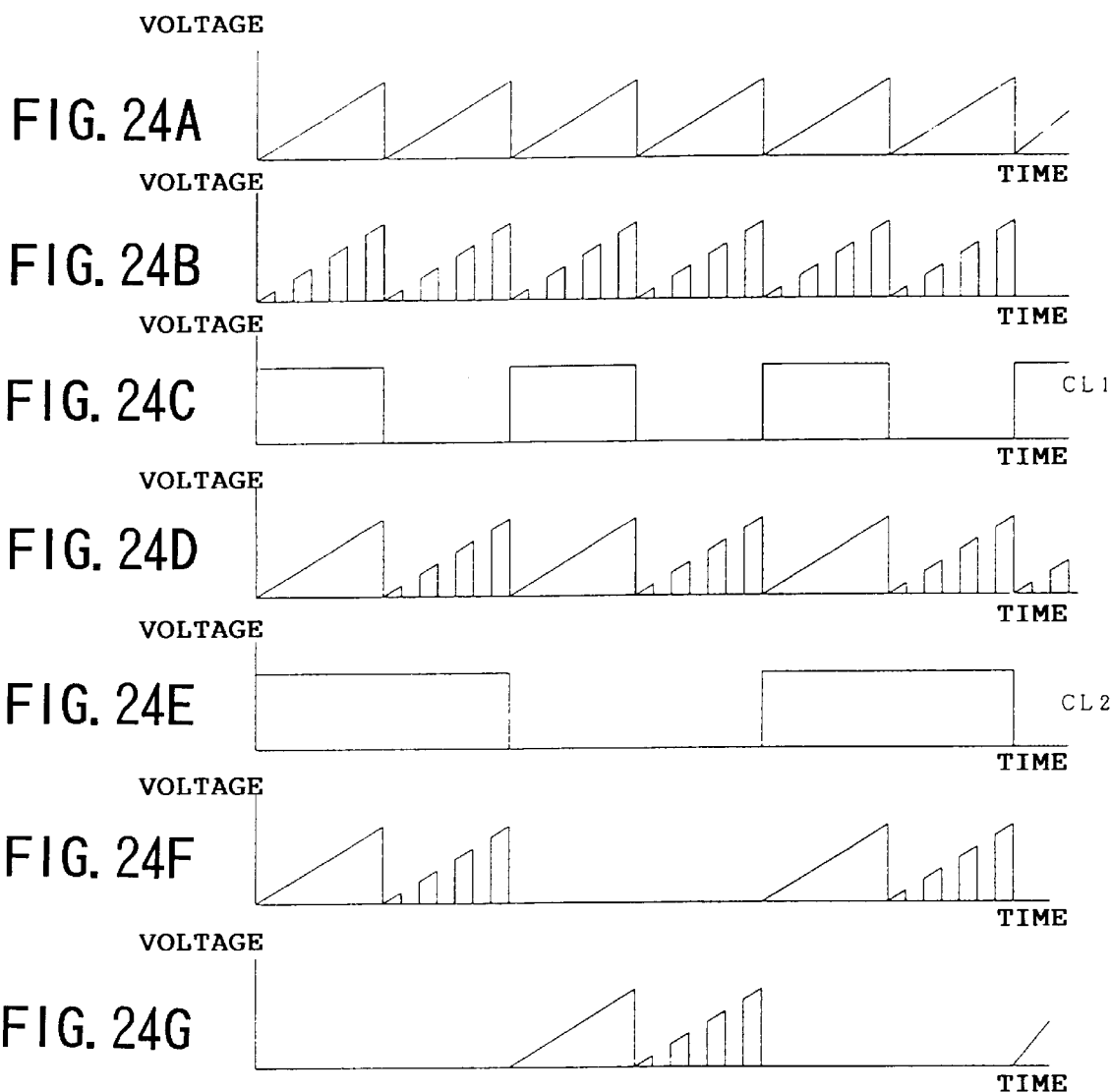
FIGS. 24A through 24G are charts for explaining operations of the voltage control unit in FIG. 22.

FIGS. 24A through 24G show operations of the voltage control unit 65 in FIG. 23. FIG. 24A shows a waveform of the DC voltage signal at the output of the DC voltage source 67. FIG. 24B shows a waveform of the AC voltage signal at the output of the AC voltage source 68. FIG. 24C shows a waveform of the first clock signal CL1 at the first output of the clock unit 66. FIG. 24D shows a waveform of the DC or AC voltage signal at the voltage output of the switching unit 69. FIG. 24E shows a waveform of the second clock signal CL2 at the second output of the clock unit 66. FIG. 24F shows a waveform of the DC or AC voltage signal at the first output of the switching unit 70, this voltage signal being supplied to the VGM cell 42. FIG. 24G shows a waveform of the DC or AC voltage signal at the second output of the switching unit 70, the voltage signal being supplied to the additional VGM cell 62.

As it is apparent from the previous description of the third embodiment, the switching unit 69 outputs the DC voltage signal (FIG. 24A) to the switching unit 70 when the first clock signal CL1 (FIG. 24C) is at a high level, and outputs the AC voltage signal (FIG. 24B) to the switching unit 70 when the first clock signal CL1 is at a low level. This operation of the switching unit 70 is repeated according to the first clock signal CL1. Thus, as shown in FIG. 24D, the DC or AC voltage signal is produced at the voltage output of the switching unit 69. This voltage signal is supplied to the switching unit 70.

The switching unit 70 outputs the voltage signal from the switching unit 69 to one of the VGM cell 42 and the additional VGM cell 62 alternately according to the second clock signal CL2. When the second clock signal CL2 is at a high level, the switching unit 70 outputs the voltage signal to the VGM cell 42. When the second clock signal CL2 is at a low level, the switching unit 70 outputs the voltage signal to the additional VGM cell 62.

Since the period of the second clock signal CL2 (FIG. 24E) is twice as great as the period of the first clock signal CL1 (FIG. 24C), the voltage signal, as shown in FIG. 24F, is supplied from the switching unit 70 to the VGM cell 42, and the voltage signal, as shown in FIG. 24G, is supplied from the switching unit 70 to the additional VGM cell 62.

The operation of the VGM 42 to deflect the incident rays is the same as that of the above-described third embodiment, and a description thereof will be omitted.

Referring to FIG. 22, the operation of the additional VGM cell 62 to deflect the incident rays will be described.

The VGM cell 62 (the additional VGM cell 62 hereinafter will be called the VGM cell 62) is arranged at 45 degrees to the initial orientation direction "A" of the VGM cell 42. When the DC voltage signal from the voltage control unit 65 is supplied to the VGM cell 62, the incident rays are deflected by the VGM cell 62 in the direction "E". When the AC voltage signal from the voltage control unit 65 is supplied to the VGM cell 62, the incident rays are deflected by the VGM cell 62 in the direction "D".

The first deflecting mirror 63 deflects the deflected rays in the direction "E", and the second deflecting mirror 64 deflects the deflected rays in the direction "D". Thus, the first and second deflecting mirrors 63 and 64 deflect all the deflected rays from the VGM cell 62, so that the range of scanning with respect to the deflected rays from the additional deflecting mirrors 63 and 64, the range of scanning with respect to the deflected rays from the deflecting mirror 44, and the range of scanning with respect to the deflected rays from the VGM cell 42 substantially overlap one another.

Figure 25:
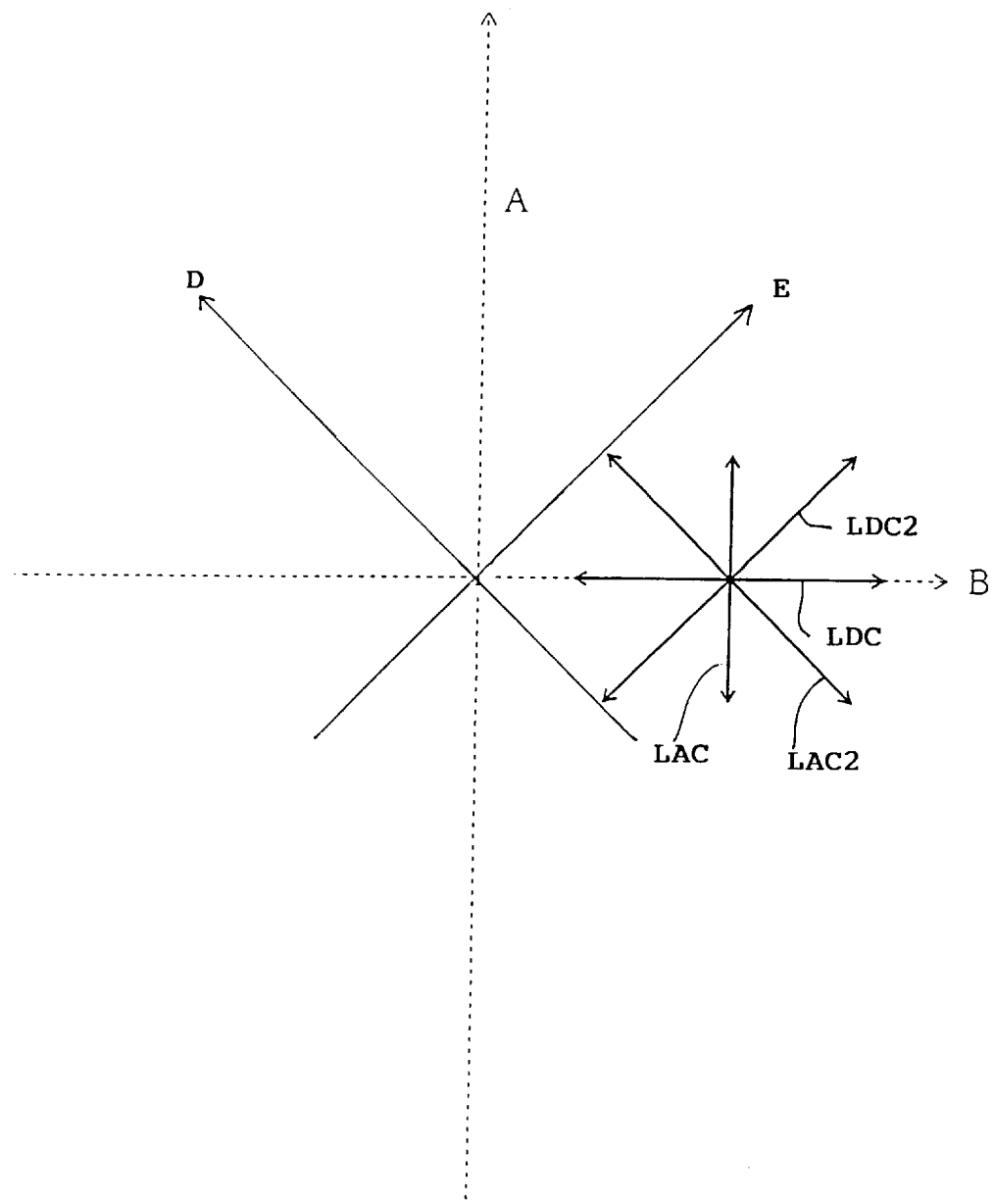
FIG. 25 is a diagram for explaining an operation of the optical deflector device in FIG. 22.

FIG. 25 shows the above-described operation of the optical deflector device in FIG. 22. In FIG. 25, the range of scanning with respect to the deflected rays from the deflecting mirror 44 is indicated by an arrow "LAC", the range of scanning with respect to the deflected rays from the VGM cell 42 is indicated by an arrow "LDC", and the ranges of the scanning with respect to the deflected rays from the first and second deflecting mirrors 63 and 64 are indicated by arrows "LDC2" and "LAC2", respectively.

In the optical deflector device 61 in the fourth embodiment, as shown in FIG. 25, it is possible that the four scanning lines in the directions "A", "B", "C" and "D" intersect one another at right angles at the center of each of the ranges of scanning. Accordingly, the optical deflector device 61 in the fourth embodiment is capable of carrying out the four-directional scanning with a good reliability by utilizing the deflecting mirrors 44, 63 and 64 and the voltage control unit 65 in addition to the VGM cells 42 62. It is not necessary to use a moving unit for performing the four-directional scanning.

Further, the present invention is not limited to the above-described embodiments, and variations and modifications may be made without departing from the scope of the present invention.

What is claimed is:

1. An optical deflector device comprising:

a VGM cell including a film of a nematic liquid crystal material which generates a distribution of spatial frequencies when subjected to an electric field; and film thickness setting means for setting a distribution of thickness of said film in said VGM cell in accordance with a film thickness distribution defined by a predetermined function, wherein said predetermined function is based on at least a thickness of said film, a wavelength of incident rays, a distance between a center of said VGM cell and a focal point, and a position of the incident point of each incident ray to said VGM cell with respect to a principal axis of said VGM cell.

2. The optical deflector device according to claim 1, wherein said film thickness setting means sets the distribution of the thickness of said film, included in said VGM cell, in accordance with the film thickness distribution defined by $$t = exp\,[(1/a)\cdot(y/\lambda\cdot\surd(F^2+y^2)+b)]$$

where t indicates said thickness of said film, $\lambda$ indicates said wavelength of incident rays, F indicates said distance between said center of said VGM cell and said focal point, y indicates the position of the incident point of each incident ray to said VGM cell with respect to said principal axis of said VGM cell, and a and b indicate constants determined by the electric field.

3. The optical deflector device according to claim 1, wherein said film thickness setting means comprises a pair of glass plates in which said film of said VGM cell is located therebetween, said glass plates including inner faces which are positioned opposite each other at a predetermined distance, at least one of said inner faces of said glass plates having a curved portion, said curved portion substantially setting the distribution of the thickness of said film of said VGM cell.

4. An optical deflector device comprising:

a VGM cell including a film of a nematic liquid crystal material which generates a distribution of spatial frequencies when subjected to an electric field, wherein said VGM cell deflects incident rays in a deflection direction perpendicular to an initial orientation direction when subjected to a DC-excited field above a threshold value, and said VGM cell deflects the incident rays in a deflection direction parallel to the initial orientation direction when subjected to an AC-excited field above the threshold value; and deflecting means for deflecting the deflected rays from said VGM cell to a predetermined position, so that a range of scanning with respect to the deflected rays from said deflecting means and a range of scanning with respect to the deflected rays from said VGM cell, not deflected by said deflecting means, substantially overlap each other.

5. The optical deflector device according to claim 4, wherein said deflecting means is a mirror which reflects the deflected rays from said VGM cell.

6. The optical deflector device according to claim 4, further comprising:

voltage control means for alternately generating one of the DC-excited field and the AC-excited field, said generated one of the DC-excited field and the AC-excited field being alternately applied to said film of said VGM cell, the DC-excited field being produced by a DC voltage signal having a triangular waveform, and the AC-excited field being produced by an AC voltage signal having a waveform that is substantially the same as said triangular waveform.

7. The optical deflector device according to claim 4, further comprising:

an additional VGM cell including a film of a nematic liquid crystal material which is the same as said nematic liquid crystal material of said VGM cell, wherein said additional VGM cell deflects the incident rays in an oblique deflection direction at an oblique angle to the initial orientation direction of said VGM cell when subjected to one of the DC-excited field and the AC-excited field; and additional deflecting means for deflecting the deflected rays from said additional VGM cell to a predetermined position, so that a range of scanning with respect to the deflected rays from said additional reflector means, the range of scanning with respect to the deflected rays from said deflector means, and the range of scanning with respect to the deflected rays from said VGM cell substantially overlap one another.

\* \* \* \* \*